United States Patent Office 3,707,484
Patented Dec. 26, 1972

3,707,484
PROCESS FOR THE PREPARATION OF 6-AZIDO-11β-HYDROXY-4,6-PREGNADIENES AND NOVEL INTERMEDIATES PRODUCED THEREBY
Richard C. Rausser, Union, and Elliot L. Shapiro, Cedar Grove, N.J., assignors to Schering Corporation, Bloomfield, N.J.
No Drawing. Filed June 15, 1971, Ser. No. 153,405
Int. Cl. C07c 173/10
U.S. Cl. 260—349                                    30 Claims

ABSTRACT OF THE DISCLOSURE

An improved process for preparing pharmacologically active 6 - azido - 11β-hydroxy-4,6-pregnadiene-3,20-diones comprises preparing an 11β-acyloxy derivative of a 6α,7α-oxido-11β-hydroxy-4-pregnene-3,20-dione, said 11β-acyloxy being a member selected from the group consisting of 11β-formyloxy-, 11β-acetoxy- and 11β-halogenoacetoxy-; treating said 6α,7α-oxido-11β-acyloxy-4-pregnene-3,20-dione with an alkali metal azide in a non-reactive, organic solvent; treating the thereby formed 6β-azido-7α-hydroxy-11β-acyloxy-4-pregnene-3,20-dione or a 7α-ester thereof with concentrated hydrochloric acid in a lower alkanoic acid together with an inert solvent or, alternatively, treating a 7α-ester thereof with a tetraalkylammonium halide in an aprotic solvent, said 7α-ester being either a 7α-lower alkanoate or a 7α-hydrocarbonsulfonate; followed by hydrolysis of the 6-azido-11β-acyloxy-4,6-pregnadiene-3,20-dione thereby formed. If desired, hydrolysis of the 11-acyloxy may be carried out on the 6β-azido-7α-hydroxy-11β-acyloxy-4-pregnene-3,20-dione intermediate.

Intermediates described and claimed in this process are 6β - azido - 7α-hydroxy-11β-acyloxy-4-pregnene-3,20-diones, the 7α-esters thereof and 6-azido-11β-acyloxy-4,6-pregnadiene-3,20-diones.

FIELD OF THE INVENTION

This invention relates to an improved process and to novel intermediates produced thereby.

More specifically, this invention relates to an improved process for the preparation of compositions of matter which may be classified as 6-azido-11β-hydroxy-3,20-diketo-4,6-bis-dehydrosteroids of the pregnane series, and to novel intermediates produced thereby.

DESCRIPTION OF THE PRIOR ART

Compositions of matter which may be classified as 6-azido-3,20-diketo-4,6-bis-dehydrosteroids of the pregnane series, methods for their manufacture, and intermediates produced thereby are described and claimed in co-pending applications Ser. Nos. 58,163 and 59,367 filed July 24, 1970 and July 29, 1970, respectively, both of common assignee as the instant application. In U.S. Ser. No. 58,163 are disclosed 6-azido-6-dehydroprogesterones possessing progestational activity and in U.S. Ser. No. 59,367 are disclosed 6-azido-4,6-pregnadiene-3,20-diones having a cortical side chain at C–17 which possess glucocorticoid properties, a preferred species of which are 6-azido-11, 17,21-trioxygenated - 4,6 - pregnadienes having enhanced anti-inflammatory activity. Among the preferred compounds claimed in both the foregoing applications are included 6-azido-4,6-pregnadiene-3,20-diones having an 11β-hydroxyl group.

Both co-pending applications describe a convenient method for preparing 6-azido-4,6-pregnadiene-3,20-diones which comprises treating a 6α,7α-oxido-4-pregnene-3,20-dione with an alkali metal azide in a non-reative, organic solvent, and treating the thereby formed 6β-azido-7α-hydroxy-4-pregnene-3,20-dione with concentrated hydrochloric acid in a lower alkanoic acid together with an inert solvent or, alternatively, treating a 7α-ester of said thereby formed 6β-azido-7α-hydroxy-4-pregnene-3,20-dione with a dehydroacyloxylating agent selected from the group consisting of tetraalkylammonium halide in an aprotic solvent, and concentrated hydrochloric acid in a lower alkanoic acid together with an inert solvent, said 7α-ester being a member selected from the group consisting of a 7α-lower alkanoate having up to 8 carbon atoms and a 7α-hydrocarbonsulfonate having up to 7 carbon atoms, whereby a 6-azido-4,6-pregnadiene-3,20-dione is formed. The intermediates in this process, i.e. 6β-azido-7α-hydroxy-4-pregnene-3,20-diones and 7-esters thereof, are also claimed in the aforenamed co-pending applications.

We have found, when carrying out the above-described process on a 6α,7α-oxido-4-pregnene-3,20-dione having an 11β-hydroxyl group, that the step of opening the 6α,7α-epoxide with an alkali metal azide goes very slowly (thus allowing competing side reactions to occur) and, particularly when there is also a 9α-halogen present, results in extremely poor yields of the 6β-azido-7α,11β-dihydroxy-4-pregnene intermediate. By our invention, we have discovered that when the 11β-hydroxyl group is converted to an 11-lower alkanoate ester (preferably an 11-acetate) prior to treatment of the 6α,7α-epoxide with an alkali metal azide, the reaction rate of the 6α,7α-epoxide opening increases and there are obtained better yields of desired product in less time and of greater purity than when utilizing the free 11β-hydroxyl steroid as starting compound. Thus, for example, 6α,7α-oxidohydrocortisone 11,21-diacetate upon treatment with sodium azide in aqueous methanol according to this invention yields 90% theoretical yield of 6β-azido-7α-hydroxyhydrocortisone 11,21-diacetate in less than one fifth the time it takes to convert the corresponding 11β-hydroxy intermediate under the same reaction conditions to 68% theoretical yield of 6β-azido-7α-hydroxyhydrocortisone 21-acetate.

The advantageous results of our improved process are particularly beneficial to an unexpected degree when a 9α-halogeno as well as an 11β-hydroxyl is present in the molecule. Thus, 6α,7α-oxido-1,2-dihydrodexamethasone 11,21-diacetate (i.e. 6α,7α-oxido-9α-fluoro-16α-methyl-4-pregnene-11β,17α,21 - triol - 3,20 - dione 11,21 - diacetate) upon treatment with sodium azide in aqueous methanol according to our process yields over 90% theoretical yield of the corresponding 6β-azido-7α-hydroxy-1,2-dihydrodexamethasone 11,21-diacetate of good purity in less than 5 days reaction time; whereas treatment of the corresponding 11β-hydroxy-6α,7α-oxido starting compound with sodium azide yields less than 2% desired product after 10 days reaction time.

By our invention, we have also discovered that by keeping the 11β-lower alkanoyloxy function in the 6β-azido-7α-hydroxy intermediates and in the 7α-esters thereof throughout the process, undesirable side reactions are advantageously minimized in the other steps of the process. Thus, for example, in the process described in the co-pending applications, when dehydroacyloxylating with tetramethylammonium fluoride a 6β-azido-7α-lower alkanoyloxy-4-pregnene having a 9α-bromo-11β-hydroxy grouping, there is formed, in addition to the desired 6-azido-9α-bromo-11β-hydroxy-4,6-pregnadiene, a substantial quantity of a side reaction product, namely, the corresponding 9β,11β-oxido derivative; whereas, when a 6β-azido-7α-alkanoyloxy-9α-bromo-11β-alkanoyloxy-4-pregnene is reacted with tetramethylammonium halide according to our improved process, there is obtained a product comprising substantially only 6-azido-9α-bromo-11β-alkanoyloxy-4,6-pregnadiene.

SUMMARY OF THE INVENTION

The invention sought to be patented in the process aspect of this invention resides in the concept of an improvement in the process of preparing a 6-azido-11β-hydroxy-4,6-pregnadiene-3,20-dione wherein a 6α,7α-oxido-11β-hydroxy-4-pregnene-3,20-dione starting compound is treated with an alkali metal azide in a non-reactive, organic solvent, and either the resulting 6β-azido-7α,11β-dihydroxy-4-pregnene-3,20-dione is treated with concentrated hydrochloric acid in a lower alkanoic acid together with an inert solvent, or a 7α-ester of said 6β-azido-7α,11β-dihydroxy-4-pregnene-3,20-dione is treated with a dehydroacyloxylating agent selected from the group consisting of tetraalkylammonium halide in an aprotic solvent, and concentrated hydrochloric acid in a lower alkanoic acid together with an inert solvent, said 7α-ester being a member selected from the group consisting of a 7α-lower alkanoate having up to 8 carbon atoms and a 7α-hydrocarbonsulfonate having up to 7 carbon atoms, whereby a 6-azido-11β-hydroxy-4,6-pregnadiene-3,20-dione is formed;

Said improvement comprising preparing an 11β-acyloxy derivative of said 6α,7α-oxido-11β-hydroxy-4-pregene-3,20-dione starting compound prior to treatment with an alkali metal azide, said 11β-acyloxy derivative being a member selected from the group consisting of 11β-formyloxy-, 11β-acetoxy- and 11β-halogeno-acetoxy;

And subsequently hydrolyzing said 11β-acyloxy derivative by treating a 6-azido-11β-acyloxy-4-pregnene intermediate selected from the group consisting of a 6β-azido-7α-hydroxy-11β-acyloxy-4-pregnene-3,20-dione and a 6-azido-11β-acyloxy-4,6-pregnadiene-3,20-dione with a hydrolytic agent selected from the group consisting of a basic hydrolytic medium, and, when said 11β-acyloxy is 11β - acetoxy, *Flavobacterium dehydrogenans* (ATCC 13930).

A preferred species of the improvement process of this invention is that wherein said 11β-acyloxy is 11β-acetoxy and said 11β-acetoxy is hydrolyzed by means of *Flavobacterium dehydrogenans* (ATCC 13930).

The aforementioned preferred specties of our improvement process is particularly useful when preparing 6-azido-11β-hydroxy-4,6-pregnadiene - 3,20 - diones of the corticoid series which have enhanced anti-inflammatory properties, particularly those substituted at C-9 by a 9α-bromo-, 9α-chloro-, or preferably, a 9α-fluoro-, and having substituents at C–16 such as 16α-methyl, 16β-methyl, 16-methylene, 16α - hydroxy, and a 16α,17α-isopropylidenedioxy function.

The invention sought to be patented in one composition-of-matter aspect of this invention resides in the concept of a chemical compound having a molecular structure comprising a steroid with a 4-pregnene-11β-lower alkanoyloxy-3,20-dione nucleus and having an azido group at C-6 and a hydroxyl group or ester thereof at C-7, said ester being an acyl residue of an acid selected from the group consisting of a hydrocarboncarboxylic acid having up to 8 carbon atoms, and a hydrocarbonsulfonic acid having up to 7 carbon atoms, which compounds are valuable as intermediates in our improved process for preparing 6-azido-4,6-pregnadiene-11β-ol-3,20 - diones described and claimed in co-pending applications Ser. Nos. 58,163 and 59,367.

The invention sought to be patented in another composition-of-matter aspect resides in the concept of a chemical compound having a molecular structure comprising a steroid with a 6-azido-11β-lower alkanoyloxy-4,6-pregnadiene-3,20-dione nucleus, which are valuable as intermediates in our improved process for preparing the therapeutically valuable 6-azido-11β-hydroxy-4,6-pregnadiene-3,20-diones of the progesterone and corticoid series and which are also valuable as intermediates in preparing 6 - azido-11β-lower alkanoyloxy-1,4,6-pregnatriene-3,20-diones which, upon hydrolysis, are convertible to the corresponding therapeutically active 11β-hydroxy compounds.

A preferred species of both composition-of-matter aspects described hereinabove are 6β-azido-7α-hydroxy-11β-acetoxy-4-pregnene-3,20-diones and the 7-acetate esters thereof and 6-azido-11β-acetoxy-4,6-pregnadiene-3,20-diones having a cortical side chain at C–17, particularly those having a 9α-halogeno substituent and a substituent at C–16 selected from the group consisting of 16α-methyl, 16β-methyl, 16-methylene, 16α-hydroxy and a 16α,17α-isopropylidenedioxy function. Of the foregoing, of particular value are those having a 9α-fluoro and a 16-methyl substituent, being intermediates in preparing 6-azido corticoids having greatly enhanced activity, namely, 6-azido-9α-fluoro-16α-methyl-4,6-pregnadiene-11β,17α,21-triol-3,20-dione and the 16β-methyl epimer thereof and their 1-dehydroanalogs and the 21-lower alkanoate esters (preferably 21-acetate) and 17,21-di-lower alkanoates (e.g. 17,21-dipropionate) of the foregoing.

General description of the 6-azido-7-oxygenated composition-of-matter aspect of the invention Included among the physical embodiments of the 6β-azido-7α-oxygenated-4-pregnenes of this invention are 6β-azido-7α-hydroxy-11β-lower alkanoyloxy-4-pregnenes and 7-esters thereof of following structural Formula I and the 1-dehydro analogs thereof:

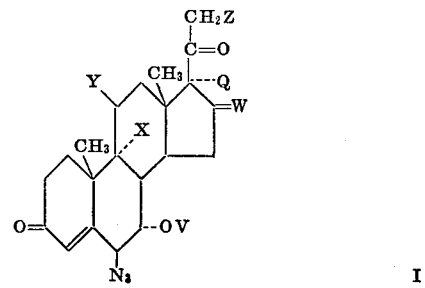

Wherein Q is a member selected from the group consisting of hydroxy, OR wherein R is an acyl radical of a hydrocarboncarboxylic acid having up to 12 carbon atoms, and hydrogen provided W is a member selected from the group consisting of hydrogen and (H, lower alkyl);

V is a member selected from the group consisting of hydrogen and an acyl radical of an acid selected from the group consisting of a hydrocarboncarboxylic acid having up to 8 carbon atoms and hydrocarbonsulfonic acid having up to 7 carbon atoms;

W is a member selected from the group consisting of hydrogen, (H, lower alkyl), (H, α-hydroxy) and (H, α-OR') wherein R' is an acyl radical of a hydrocarboncarboxylic acid having up to 12 carbon atoms, =CHT wherein T is a member selected from the group consisting of hydrogen, lower alkyl, fluorine and chlorine, and when taken together with Q, 16α,17α-lower alkylidenedioxy;

X is a member selected from the group consisting of hydrogen and a halogen having an atomic weight less than 100;

Y is a member selected from the group consisting of formyloxy, acetoxy and halogenoacetoxy; and Z is a member selected from the group consisting of halogen, hydrogen, hydroxy, OR" wherein R" is an acyl radical of an acid selected from the group consisting of a hydrocarboncarboxylic acid having up to 12 carbon atoms, and when taken together with Q, 17α,21-lower alkylidenedioxy.

The alkyl groups included within the definition of substituents W and T are preferably lower alkyl groups, i.e. hydrocarbon radicals having preferably up to four carbon atoms such as methyl, ethyl, n-propyl, iso-propyl, n-butyl, sec.-butyl, and tert.-butyl, although higher homologs such as pentyl and hexyl come within the scope of this invention.

The alkylidene groups contemplated in the compounds of our invention are preferably lower alkylidenes, i.e. hydrocarbon radicals having preferably up to four carbon atoms and having a terminal double bond, including radicals such as methylene, ethylidene, n-propylidene, iso-propylidene, n-butylidene, and sec.-butylidene and the like. The 16-lower alkylidene derivatives of this invention (i.e. when W in above Formula I is =CHT) are double bonded to the D-ring at C–16. The 16α,17α-alkylidenedioxy derivatives have the alkylidene terminal bonds attached to different oxygen atoms, i.e. to the oxygens at C–16 and C–17 in the case of the 16α,17α-alkylidenedioxy derivatives.

As used in the specification and claims of this application, the term "acyl" denotes an organic radical derived from an organic acid by the removal of the hydroxyl group, e.g. acetyl is the acyl radical of acetic acid, benzenesulfonyl is the acyl radical of benzenesulfonic acid, and benzoyl is the acyl radical of benzoic acid.

The acyl radicals of the compounds of this invention as defined by R, R', and R'' in Formula I hereinabove include those derived from hydrocarboncarboxylic acids having up to 12 carbon atoms which may be saturated, unsaturated, straight chain or branched chain, aliphatic, cyclic, cyclic-aliphatic, aromatic, aryl-aliphatic, or alkyl-aromatic, and may be substituted by hydroxy, alkoxy containing from 1 to 5 carbon atoms or by halogen such as fluorine, chlorine, or bromine. Typical ester groups of the 6-azido-6-dehydroprogesterones of our invention are thus derived from hydrocarboncarboxylic acids such as alkanoic acids exemplified by formic, acetic, propionic, trimethylacetic, butyric, iso-butyric, valeric, iso - valeric, caproic, caprylic, capric, undecyclic and lauric acids; substituted alkanoic acids such as phenoxyacetic, trifluoroacetic, and β-chloropropionic acids; aromatic and substituted aromatic acids including benzoic, toluic, p-chlorobenzoic acids; arylalkanoic acids such as phenylacetic and phenylpropionic acids; unsaturated acids such as acrylic and sorbic acids; and dibasic acids such as succinic, tartaric and phthalic acids.

The term "lower alkanoyloxy" is contemplated as including acid radicals of lower alkanoic acids having preferably up to 8 carbon atoms such as radicals obtained from acetic, propionic, butyric, valeric, caprylic, caproic, tert.-butylacetic acid and the like.

The halogens at C–9 as defined by X in above Formula I are bromine, chlorine, and preferably fluorine. The halogens at C–21 as defined by Z in above Formula I are fluorine, chlorine, bromine and iodine, the 21-bromo- and 21-iodoprogesterones of this invention being valuable mainly as intermediates.

The acyl radicals contemplated as included within the definition of V in Formula I are those derived from hydrocarboncarboxylic acids having up to 8 carbon atoms including lower alkanoic acids exemplified by formic, acetic, propionic, trimethylacetic, butyric, iso-butyric, tert.-butyric, valeric, iso-valeric, caproic and caprylic; substituted alkanoic acids such as trifluoroacetic and β-chloropropionic acids, aromatic and substituted aromatic acids such as benzoic, toluic, p-chlorobenzoic, and hydrocarbonsulfonic acids having up to 7 carbon atoms such as methanesulfonic acid, ethanesulfonic acid, benzenesulfonic acid and p-toluenesulfonic acid.

Contemplated as included within the "halogeno-acetoxy" derivatives defined by Y at C–11 are radicals derived from acids such as mono-chloroacetic acid, trichloroacetic acid, bromoacetic acid and, preferably, trifluoroacetic acid.

The physical embodiments of the 6β-azido-7α-hydroxy-11β-lower alkanoyloxy-4-pregnene-3,20-diones and 7α-esters thereof of Formula I, their method of preparation and use as intermediates in our improved process for preparing 6-azido-11β-hydroxy - 4,6 - pregnadiene-3,20-diones are discussed further hereinbelow in the general description of the process aspect of this invention and are described in detail in the examples, the 1-dehydro analogs of Formula I being prepared in similar manner.

Typical intermediates of Formula I include 6β-azido-7α-hydroxyprogesterones and their 7α-esters (i.e. compounds of Formula I wherein Z is hydrogen or halogen) such as, 6β - azido - 7α - hydroxy - 11β,17α - bis - acetoxy-16-methyleneprogesterone (i.e. 6β - azido - 7α - hydroxy-16-methylene-4-pregnene-11β,17α - diol - 3,20 - dione 11,17-diacetate), the 7-acetate ester thereof, the 7-methanesulfonate ester thereof, the 7-p-toluenesulfonate ester thereof, the 9α-fluoro derivatives of the foregoing, and the 16α-methyl and the 16β-methyl homologs thereof;

6β-azido - 7α - hydroxy - 16 - ethylidene-4-pregnene-11β,17α-diol-3,20-dione 11,17-diacetate and the 7α-acetate ester thereof;

6β-azido - 7α - hydroxy - 9α - fluoro -11β-acetoxy-16α,17α-iso-propylidenedioxy - 4 - pregnene - 3,20 - dione and the 7α-acetate ester thereof; and 6β-azido - 7α - hydroxy - 9α,21 - difluoro - 4 - pregnene-11β,17α - diol - 3,20 - dione 11,17-diacetate, the 7α-acetate ester thereof, and the 16α-methyl and the 16β-methyl homologs thereof.

Preferred compounds of Formula I are 6β-azido-7α-hydroxy-11β-lower alkanoyloxy - 4 - pregnene-3,20-diones of Formula I and 7α-esters thereof which have a cortical side chain at C–17 (i.e. compounds of Formula I wherein Z is hydroxy or acyloxy), and particularly those having a halogen at C–9, e.g. a 9α-bromo-, 9α-chloro-, or preferably a 9α-fluoro. Particularly valuable are the 6β-azido-7α-hydroxy - 9α - fluoro - 11β - lower alkanoyloxy-4-pregnene-3,20-diones of Formula I having a substituent at C–16 such as a 16-methylene, 16α-hydroxy or derivative thereof or, preferably, a 16α-methyl or 16β-methyl group. Included among the preferred intermediates of Formula I are compounds such as, 6β - azido - 7α - hydroxy - 4 - pregnene - 11β,16α,17α,21-tetrol-3,20-dione 11,16,21-triacetate, the 7α-acetate ester thereof, and the 9α-fluoro derivatives of the foregoing;

6β-azido - 7α - hydoxy - 16 - methylene - 4 - pregnene-11β,17α,21-triol-3,20-dione 11,21-diacetate, the 7-acetate ester thereof, and the 9α-fluoro derivatives of the foregoing; and 6β - azido - 7α - hydroxy - 16α - methyl - 4 - pregnene-11β,17α,21-triol - 3,20 - dione 11,21 - diacetate, and the 16β-methyl epimer thereof and their 7α-acetate esters and the 9α-bromo-, 9α-chloro- and 9α-fluoro derivatives of the foregoing.

General description of the 6-azido-11β-lower alkanoyloxy-4,6-pregnadiene composition-of-matter aspect of the invention Included among the physical embodiments of the 6-azido-11β-lower alkanoyloxy-4,6-pregnadiene-3,20-diones of this invention are members selected from the group consisting of compounds of following structural Formula II and the 1-dehydro analogs thereof:

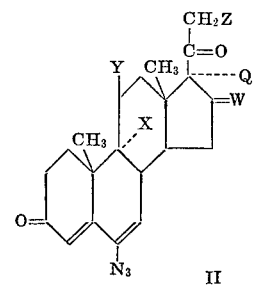

II wherein Q, W, X and Y are as defined hereinabove for Formula I and wherein Z is a member selected from the group consisting of hydrogen, halogen, hydroxy, OR'' wherein R'' is an acyl radical of an acid selected from the group consisting of a hydrocarbonsulfonic acid having up to 7 carbon atoms and a hydrocarboncarboxylic acid having up to 12 carbon atoms, and when taken together with Q, 17α,21-lower alkylidenedioxy.

The 6β - azido-11β-lower alkanoyloxy-4,6-pregnadienes of Formula II are intermediates in the process of this invention and are immediate precursors of the pharmacologically active 11β-hydroxy derivatives which are described and claimed in co-pending applications Ser. Nos. 58,163 and 59,367 of common assignee as the instant application. The 6β-azido-11β-lower alkanoyloxy-4,6-pregnadienes of Formula II are also convertible to the corresponding 1-dehydro analogs of Formula II (for example, by reaction with dichlorodicyanobenzoquinone in a non-reactive, organic solvent in the presence of a strong acid) and the resulting 6-azido-11β-lower alkanoyloxy-1,4,6-pregnatrienes upon hydrolysis yield the pharmacologically active corresponding 11β-hydroxy-1,4,6-pregnatrienes.

The physical embodiments of the 6-azido-11β-lower alkanoyloxy - 4,6 - pregnadiene - 3,20 - diones of this aspect of our invention and their use as intermediates in our improved process are discussed further hereinbelow in the general description of the process aspect of this invention and are described in detail in the examples, the 1-dehydro analogs of Formula II being prepared in similar manner.

Typical intermediates of Formula II include 6-azido-11β-lower alkanoyloxy-6-dehydroprogesterones and derivatives thereof (i.e. compounds of Formula II wherein Z is hydrogen or halogen) such as, 6 - azido - 11β,17α - diacetoxy - 16 - methylene-6-dehydroprogesterone (i.e. 6-azido - 16 - methylene-4,6-pregnadiene-11β,17α-diol-3,20-dione 11,17-diacetate), the 9α-fluoro derivatives thereof, and the 16α-methyl and 16β-methyl homologs of the foregoing;

6 - azido - 16 - ethylidene - 4,6 - pregnadiene-11β,17α-diol-3,20-dione 11,17-diacetate;

6 - azido - 9α-fluoro-11β-acetoxy-16α,17α-iso-propylidenedioxy-4,6-pregnadiene-3,20-dione; and 6 - azido - 9α,21-difluoro-4,6-pregnadiene-11β,17α-diol-3,20-dione 11-acetate and the 16α-methyl and 16β-methyl homologs thereof.

Preferred compounds of Formula II are those having a cortical side chain at C–17 (compounds of Formula I wherein Z is hydroxy or acyloxy), and particularly those having a halogen at C–9, preferably a 9α-fluoro. Particularly valuable intermediates are the 6-azido-9α-fluoro-11β-lower alkanoyloxy-4,6-pregnadiene-3,20-diones of Formula II having a substituent at C–16 selected from the group consisting of 16-methylene, 16α-hydroxy or derivatives thereof and, preferably a 16α-methyl or 16β-methyl group. Included among the preferred intermediates of Formula II are compounds such as, 6 - azido - 4,6-pregnadiene-11β,17α,21-triol-3,20-dione 11,21-diacetate and the 9α-fluoro derivatives thereof;

6 - azido - 4,6-pregnadiene-11β,16α,17α,21-tetrol-3,20-dione 11,16,21-triacetate and the 9α-fluoro derivatives of the foregoing;

6 - azido - 16 - methylene-4,6-pregnadiene-11β,17α,21-triol-3,20-dione 11,21-diacetate and the 9α-fluoro derivatives of the foregoing; and 6 - azido - 16α-methyl-4,6-pregnadiene-11β,17α,21-triol-3,20-dione 11,21-diacetate and the 16β-methyl epimer thereof and their 7α-acetate esters and the 9α-bromo-, 9α-chloro-, and 9α-fluoro derivatives of the foregoing.

GENERAL DESCRIPTION OF THE PROCESS ASPECT OF THE INVENTION

In co-pending applications of common assignee as the instant application, U.S. Ser. Nos. 58,163 and 59,367 filed July 24, 1970 and July 29, 1970, respectively, are described pharmacologically active 6-azido-4,6-pregnadienes including 11β-hydroxy-6-azido-4,6-pregnadienes defined by structural Formula III in Chart A hereinbelow, and the 1-dehydro analogs thereof wherein Q, W, X, and Z are as hereinabove defined for Formula I.

The compounds of Formula III wherein Z is hydrogen are described as progestational agents and as possessing anti-androgenic activity, thus being useful in the treatment of disorders such as acne or benign prostatic hypertrophy; those compounds wherein Z is fluoro and Q is hydroxy are described as having topical anti-inflammatory activity; and those compounds wherein Z is hydroxy or hydrocarboncarboxyloxy are described as possessing glucocorticoid activity and, when Q is hydroxy or an ester thereof, as being particularly valuable as anti-inflammatory agents. The compounds of Formula III are further described as having an activity similar to, but enhanced over, that of the corresponding 6-unsubstituted-6,7-dehydro prior art analogs. Thus, particularly preferred 6-azido-11β-hydroxy-4,6-pregnadiene corticoids of Formula III are 6-azido-1,2-dihydro - 6,7-dehydro analogs of 6-unsubstituted-11β-hydroxy-1,4-bis-dehydro-corticoids known to possess useful glucocorticoid and corticosteroid properties, e.g. 9α-fluoro-11β-hydroxy-corticoids such as dexamethasone (i.e. 9α-fluoro - 16α-methyl-1,4-pregnadiene-11β,17α,21-triol-3,20-dione), betamethasone (9α-fluoro-16β-methyl-1,4-pregnadiene-11β,17α,21-triol-3,20-dione), triamcinolone (i.e. 9α-fluoro - 1,4-pregnadiene-11β,16α,17α,21-tetrol-3,20-dione), and prednylidene (i.e. 16-methylene-1,4-pregnadiene-11β, 17α,21-triol-3,20-dione) and the 21-diethylaminoacetate ester thereof.

Co-pending application Ser. Nos. 58,163 and 59,367 describe processes whereby the therapeutically valuable 6-azido-4,6-pregnadienes of Formula III are conveniently prepared from the corresponding 6α,7α-oxido-4-pregnenes, which processes are shown diagramatically hereinbelow in Chart A, substituents Q, W, X and Z in structural Formulae A, B, C, and III being as defined hereinabove for Formula I:

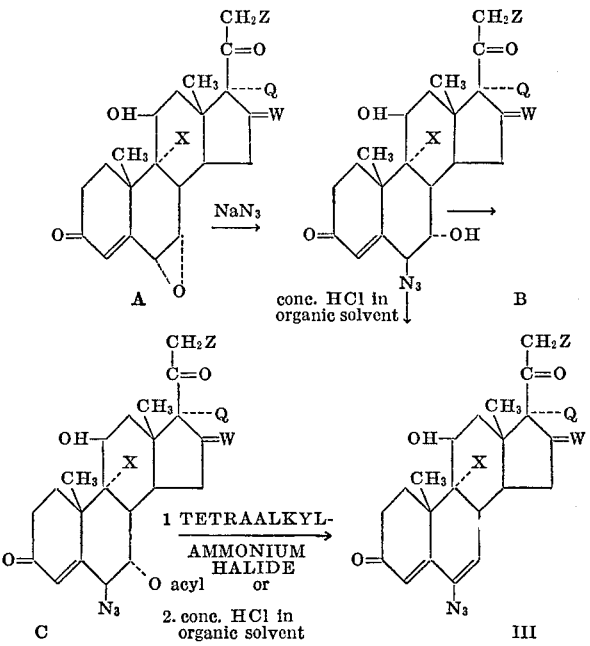

CHART A

Briefly, the prior art process involves two reaction sequences as indicated hereinabove, i.e. A→B→C→III and A→B→III, the former three-step sequence being a preferred method, particularly when the dehydroacyloxylation step (i.e. C→III) is carried out utilizing tetraalkylammonium halide. In the prior art processes, a 6α,7α-oxido - 9α - X-11β-hydroxy-16-W-17α-Q-21-Z-4-pregnene-3,20-dione (Formula A) (e.g. 6α,7α-oxido-11β-hydroxy-16-methylene-17α-acetoxy-4-pregnene-3,20-dione or 6α,7α-oxido - 4-pregnene-11β,17α,21-triol-3,20-dione 21-acetate) is treated with an alkali metal azide (e.g. sodium azide) in a non-reactive, organic solvent, preferably a solvent mixture in which water is present (e.g. aqueous methanol, aqueous dioxane, aqueous dimethylformamide, aqueous methanol/dioxane, aqueous tetrahydrofuran, and the like) under mild conditions in neutral or slightly acidic or basic media whereby the epoxy function is split and there is introduced into the molecule a 6β-azido-7α-hydroxy system to form an intermediate, i.e. a 6β-azido-7α,11β-dihydroxy-4-pregnene of Formula B (e.g. 6β-azido-7α,11β-dihydroxy - 16 - methylene - 17α-acetoxy-4-pregnene-3,20-dione and 6β-azido-4-pregnene-7α,11β,17α,21-tetrol-3,20-dione 21-acetate, respectively).

When carrying out the two-step prior art process (i.e. A→B→III), the 6β-azido-7α,11β-dihydroxy intermediate, B, is then dehydrated at C-7 (6) by treatment with concentrated hydrochloric acid in a lower alkanoic acid (e.g. acetic acid) together with an inert solvent (e.g. dioxane) to produce a pharmaceutically active 6 - azido-11β-hydroxy-4,6-pregnadiene of Formula III.

Preferably, when carrying out the three-step prior art process (i.e. A→B→C→III), the 7α-hydroxy function in the thereby formed intermediate of Formula B is esterified utilizing known esterification procedures (e.g. that utilizing acetic anhydride in pyridine at room temperature). Treatment of the resulting 6β-azido-7α-acyloxy-11β-hydroxy-9α-X-16-W-17α-Q-21-Z-4-pregnene-3,20-dione (Formula C) intermediate (e.g. 6β-azido-7α,17α-diacetoxy-11β-hydroxy-16-methylene-4-pregnene-3,20-dione or 6β-azido-4-pregnene-7α,11β-17α-21-tetrol-3,20-dione 7,21 - diacetate, respectively) with a tetraalkylammonium halide (e.g. tetramethylammonium fluoride) in an aprotic solvent, preferably acetonitrile or dimethylformamide, yields a pharmacologically active 6 - azido-11β-hydroxy-9α-X-16-W-17α-Q-21-Z-4,6-pregnadiene-3,20 - dione of compound III, e.g. 6 - azido-11β-hydroxy-16-methylene - 17α - acetoxy-4,6-pregnadiene-3,20 - dione and 6-azido-6-dehydrohydrocortisone 21-acetate (i.e. 6-azido-4,6-pregnadiene-11β,17α - 21 - triol-3,20-dione 21-acetate), respectively. Alternatively, the dehydroacyloxylation step (C→III) may be carried out utilizing concentrated hydrochloric acid in acetone or preferably in a solvent mixture comprising a lower alkanoic acid (e.g. acetic acid) and dioxane.

The necessary 6α,7α-oxido-4-pregnene-3,20-dione starting compounds (A) for the prior art process are conveniently prepared according to known procedures from the corresponding 6,7-unsubstituted-4,6-pregnadiene-3,20-dione such as by reaction with a peracid in a non-reactive, organic solvent, e.g. with reagent-solvent combinations such as meta-chloroperbenzoic acid in solvents such as acetone or ethyl acetate, meta-chloroperbenzoic acid in methylene chloride/tert.-butanol, or with mono-perphthalic acid in solvents such as chloroform or methylene chloride. In turn, the 6,7-unsubstituted-4,6-pregnadiene-3,20-dione precursors are conveniently derived from the corresponding 6,7-dihydro analogs by procedures known to effect dehydrogenation between C-6 and C-7, such as those utilizing chloranil or 2,3-dichloro-5,6-dicyanobenzoquinone (DDQ). When the starting steroid has a 16-alkyl substituent, e.g. 16β-methyl - 4 - pregnene-3,20-dione, in order to minimize the possibility of rearrangement reactions, introduction of the 6-dehydro bond is preferentially effected by the use of 2,3-dichloro-5,6-dicyanobenzoquinone in the presence of acid (e.g. DDQ in dioxane and hydrogen chloride gas).

When preparing the 6-azido-4,6-bis-dehydropregnanes of Formula III in the manner outlined in Chart A, it is usually preferable to have present in the starting 6α,7α-epoxypregnene (A) all the substituents desired in the final 6-azido-4,6-pregnadiene product, III.

When carrying out the first step (i.e. A→B) of the prior art process, the opening of the 6α,7α-oxido function to form the corresponding 6β-azido-7α-hydroxy intermediate B is usually completed in a relatively short time when the 11-carbon is unsubstituted or has an 11-keto substituent. Thus, for example, 6α,7α-oxido-16-methylene-17α-acetoxy-4-pregnene-3,20-dione (an 11-unsubstituted analog of a 6α,7α-oxido progesterone of Formula A, Chart A) upon treatment with sodium azide in aqueous methanol in the presence of acetic acid at room temperature for about 18 hours yields about 80 to 90% theoretical yield of 6β-azido-7α-hydroxy-16-methylene-17α-acetoxy-4-pregnene-3,20-dione. Similarly, reaction of 6α,7α-oxido - 4 - pregnene-17α,21-diol-3,11,20-trione 21-acetate (an 11-keto analog of a 6α,7α-oxido-4-pregnene of Formula A, Chart A, having a cortical side chain at C–17) with sodium azide in aqueous methanol in the presence of acetic acid at room temperature yields, after about 18 hours reaction time, over 90% theoretical yield of purified 6β - azido - 7α-hydroxy-4-pregnene-17α,21-diol-3,11, 20-trione 21-acetate. Furthermore, when the foregoing reaction on the 11-keto compound is carried out at about 50° C., the reaction is essentially completed in less than an hour.

We have found, however, that when an 11β-hydroxyl group is present in the 6α,7α-oxido-4-pregnene-3,20-dione starting compound, A, conversion of the 6α,7α-oxido starting function to a 6β-azido-7α-hydroxy derivative proceeds very slowly, providing an opportunity for competing side reactions to occur and resulting in poorer yields of 6β-azido-7α,11β-dihydroxy-4-pregnene - 3,20 - diones of less purity than those obtained when an 11-unsubstituted or an 11-keto-6α,7α-oxido-4-pregnene is reacted with an alkali metal azide. Thus, for example, when the 11β-hydroxylated compound, 6α,7α-oxidohydrocortisone 21-acetate (i.e. 6α,7α - oxido-4-pregnene-11β,17α,21-triol-3,20-dione 21-acetate) is reacted with sodium azide in aqueous methanol at room temperature (as described in Example 5) in a manner similar to that in which the above-mentioned 6α,7α-oxido-11-unsubstituted and 6α,7α-oxido-11-keto-4-pregnenes were treated, only one third of the starting compound had reacted after 18 hours and after 4 days, when thin layer chromatographic analysis indicated no further starting 6α,7α-oxido-4-pregnene remained in the reaction mixture, there was isolated 68% theoretical yield of 6β-azido-7α-hydroxyhydrocortisone 21-acetate (i.e. 6β - azido - 4 - pregnene-7α,11β,17α,21-tetrol-3,20-dione 21-acetate).

We have discovered further that, when the 6α,7α-oxido-11β - hydroxy - 4 - pregnene intermediate also has a 9α-halogeno group (such as in 6α,7α - oxido-9α-fluoro-16α-methyl-4-pregnene-11β,17α,21-triol-3,20-dione 21-acetate) fission of the 6α,7α-oxido group with sodium azide under the conditions of the prior art process (as described in Example 2) proceeds at an even slower rate with the result that after 10 days reaction time, when thin layer chromatographic analysis indicates substantially all the 6α,7α-oxido-9α-fluoro - 11β - hydroxy-4-pregnent starting compound has been consumed, only about 2% of the desired 6β - azido - 7α - hydroxy - 9α - fluoro-16α-methyl-4-pregnene-3,20-dione 21-acetate is isolated from the reaction mixture. Moreover, isolation is accomplished with difficulty due to the presence of decomposition products and products of side reaction. Similarly, when the 16β-methyl epimer of the foregoing 6α,7α-oxido-4-pregnene is reacted with sodium azide under the conditions of the prior art process, after the 15 days reaction time required to consume substantially all the 6α,7α-oxido-4-pregnene starting compound, there is isolated less than 2% theoretical yield of the desired 6β-azido-7α-hydroxy-9α-fluoro-16β-methyl - 4 - pregnene-11β,17α-21-triol-3,20-dione 21-acetate intermediate B.

By our invention, we have discovered that, when the 11β - hydroxyl group in a 6α,7α - oxido - 9α - halogeno-11β-hydroxy - 4 - pregnene A (e.g. 6α,7α-oxido-9α-fluoro-16α-methyl - 4 - pregnene-11β,17α,21-triol-3,20-dione 21-acetate) is converted to an 11-lower alkanoate ester (preferably 11-acetate) prior to reaction with sodium azide, the opening of the 6α,7α-oxido ring occurs at a faster rate and there is obtained good yields of 6β-azido-7α-hydroxy - 11β - lower alkanoyloxy-4-pregnene intermediate of good purity which is easily isolated from the reaction mixture. Thus, for example, when 6α,7α-oxido-9α-fluoro-16α-methyl - 4 - pregnene-11β,17α,21-triol-3,20-dione 11,21-diacetate is treated with sodium azide according to our improved process, in less than 5 days there is obtained over 90% theoretical yield of 6β-azido-7α-hydroxy-9α-fluoro - 16α - methyl - 4 - pregnene-11β,17α,21-triol-3,20-dione 11,21-diacetate. Thus, by our improved process, in less than ½ the reaction time required in the prior art process, there is produced over a forty-fold increase in product yield (i.e. from about 2% to about 91% theoretical yield). Similarly, when the 16β-methyl epimer of the foregoing is reacted according to our improved process, in 7 days reaction time there is obtained 95.4% theoretical yield of purified 6β-azido - 7α - hydroxy-16β-methyl-4-pregnene-11β,17α,21 - triol-3,20-dione 11,21-diacetate, at least a 40-fold yield increase of product in less than half the reaction time required by the prior art process.

When our improvement process is carried out on a 9-unsubstituted - 11β - hydroxy-6α,7α-oxido - 4 - pregnene, improved yields of product are likewise obtained in a shorter time than by the prior art method. Thus, when 6α,7α-oxidohydrocortisone 11,21-diacetate is reacted according to our process with sodium azide under conditions similar to those under which 6α,7α-hydrocortisone 21-acetate is treated, 30% conversion of the starting 6α,7α-oxido - 11β - acetoxy - 4 - pregnene occurs in three hours (as opposed to 18 hours for 30% conversion in the prior art process) and after 18 hours, there is isolated from the reaction mixture 90% theoretical yield of 6β-azido - 7α - hydroxyhydrocortisone 11,21-diacetate of good purity which is a 22 percent yield increase in about one sixth the reaction time required in the prior art process for the conversion of 6α,7α-oxidohydrocortisone 21-acetate, A, to a 68% theoretical yield of the corresponding 6β-azido - 7α - hydroxyhydrocortisone 21-acetate, B.

Our invention finds its greatest use when preparing 6-azido-9α-fluoro - 11β - hydroxy-4,6-pregnadienes, a preferred species being that utilizing 6α,7α - oxido-11β-lower alkanoyloxy-4-pregnene - 3,20 - dione starting compounds having a 9α-fluoro substituent and a corticoid side chain at C–17, preferably also having a substituent at C–16 selected from the group consisting of methylene, α-hydroxy, β-methyl and α-methyl since, by utilizing these starting compounds, our process produces in good yields, 6-azido - 11β - lower alkanoyloxy-4,6-pregnadiene intermediates of Formula II, which, upon hydrolysis, yields 6-azido - 11β - hydroxy-4,6-pregnadienes of Formula III having potent anti-inflammatory activity.

In brief, our improved process comprises esterifying the 11β-hydroxy group in a 6α,7α-oxido - 11β - hydroxy-4-pregnene-3,20-dione (compound A) prior to carrying out the process outlined in Chart A and then preferably hydrolyzing the 11-acetate after formation of novel intermediates of Formula II which are 11-lower alkanoate esters of compounds of Formula III in Chart A.

Our improved process is preferably carried out on the 11-acetate ester since it is easily prepared and remains unchanged throughout the reaction sequence outlined in Chart A, and is easily hydrolyzed in good yields either chemically via mild alkaline hydrolysis or, preferably, is hydrolyzed by means of the organism *Flavobacterium dehydrogenans* var. Hydrolyticum (ATCC 13930) utilizing standard procedures.

Our process is also conveniently carried out utilizing the 11-formate esters of 11-halogenoacetate esters, preferably the 11-trifluoroacetate, all of which are prepared with relative ease and can be hydrolyzed under mild alkaline hydrolytic conditions. Contemplated as included within the term 11-halogenoacetate esters are esters derived from bromoacetic acid, chloroacetic acid, trichloroacetic acid and, preferably, trifluoroacetic acid.

The preferred 11-acetate esters of compounds defined by Formula A, Chart A, are prepared from the corresponding 11β-hydroxy - 6α,7α - oxido-4-pregnene under mild basic conditions known to esterify secondary hydroxyls such as that utilizing a large molar excess of acetic anhydride in pyridine. When carrying out the prior art process outlined in Chart A, it is desirable that the hydroxyl group at C–21 be protected such as by an ester group; accordingly, if desired, esterification at C–21 can be carried out concomitantly with esterification at C–11. When preparing an 11-acetate ester by means of acetic anhydride in pyridine alone at room temperature, the esterification proceeds slowly requiring several weeks for completion; however, when carried out at about 50° C., good yields of the 11-acetate ester are obtained after three days reaction time. A preferred method of preparing the 11-acetate ester is to add 4-dimethylaminopyridine to the aforedescribed esterification medium and there are obtained excellent yields of 11-acetate ester in less reaction time. Thus, esterification of 6α,7α-oxido-9α-fluoro-16α-methyl-4-pregnene-11β,17α,21-triol-3,20-dione 21-acetate with acetic anhydride in pyridine in the presence of 4-dimethylaminopyridine as described in Preparation 1–C produces approximately theoretical yields of the corresponding 11-acetate ester in 18 hours. Generally, when preparing an 11-acetate ester of an 11-hydroxysteroid defined by Formula A, Chart A, to one gram of 11β-hydroxy-6α,7α-oxido - 4 - pregnene dissolved in 10 ml. of pyridine there is added 2 ml. acetic anhydride and 50 mg. of 4-dimethylaminopyridine. The reaction is preferably carried out at room temperature from 10 to 20 hours. Esterification of an 11-hydroxy-4-pregnene of Formula A, Chart A, can also be carried out with acetic anhydride and 4-dimethylaminopyridine alone, or with 4-dimethylaminopyridine mixed with triethylamine. When carrying out our process utilizing the 11-acetate esters of the 11β-hydroxy intermediates A, Chart A, which also have a 17α-acyloxy and/or a 21-acyloxy group, the esters at C–17 and/or at C–21 in the starting 6α,7α-oxido - 11β - acetoxy-4-pregnene-3,20-dione may be derived from any hydrocarbon-carboxylic acid having up to 12 carbon atoms and there will be obtained the corresponding 6β-azido-7α-hydroxy-11β-acetoxy-17α- and/or 21 - acyloxy - 4 - pregnene-3,20-dione, convertible to a 7α-ester followed by dehydroacyloxylation, and there will be obtained the corresponding 6-azido - 11β - acetoxy-17α- and/or 21-acyloxy-4,6-pregnadiene-3,20-dione (Formula III, Chart A).

In the preferred mode of our improved process, the 11-acetate ester of 6α,7α-oxido-11β-hydroxy-4-pregnenes of Formula A, Chart A, is carried through the sequence of three steps A→B→C→III or through two steps A→B→III as outlined in Chart A (and as discussed hereinabove and as illustrated in detail in the examples) and there is obtained the corresponding 11-acetate ester of the 6-azido-11β-hydroxy-4,6-pregnadiene of Formula II. The manner of carrying out the reaction steps

A→B→C→III and steps A→B→III is essentially the same as that described for the prior art process in co-pending applications Ser. Nos. 58,163 and 59,367.

When carrying out the preferred mode of our improved process utilizing an 11-acetate ester intermediate A, after preparation of the 6β-azido-7α-hydroxy-11β-hydroxy-4-pregnene intermediate B, the 7α-hydroxy function is preferentially converted to the 7-acetate ester and the resulting 6β-azido-7α,11β-diacetoxy - 4 - pregnene is dehydroacetoxylated by means of a tetramethylammonium halide, preferably teramethylammoniumfluoride. We have found that the acetylation of the 7α-hydroxyl group is advantageously carried out in the presence of 4-dimethylaminopyridine under conditions similar to those described hereinabove for the esterification at C–11. When 4-dimethylaminopyridine is used in this esterification step, the reaction proceeds at a faster rate giving rise to greater yields of purer product than when esterification is carried out utilizing pyridine and acetic anhydride alone.

When preparing a 6-azido-9α-bromo-11β-hydroxy-4,6-pregnadiene from a 6α,7α-oxido-9α-bromo-11β-hydroxy-4-pregnene by the process described in co-pending applications Ser. Nos. 58,163 and 59,367 of common assignee, in the last step of said process a 6β-azido-7α-acyloxy-9α-bromo-11β-hydroxy-4-pregnene upon treatment with tetraalkylammonium halide in acetonitrile (for example) yields a product mixture comprising 6-azido-9β,11β-oxido-4,6-pregnadiene together with 6-azido-9α-bromo-11β-hydroxy-4,6-pregnadiene.

When preparing a 6-azido-9α-bromo-11β-hydroxy-4,6-pregnadiene by our improvement process, the presence of the 11-acetate function advantageously eliminates the formation of the 9β,11β-oxido side product and there is produced a product comprising mainly the desired 6β-azido-9α-bromo-11β-acetoxy-4,6-pregnadiene.

After carrying out the reaction sequences outlined in Chart A hereinabove utilizing preferentially an 11-acetate ester of the 11-hydroxy compounds shown therein, there is obtained an 11-acetate ester of compound III. Hydolysis of the 11-acetate is easily effected utilizing chemical means, e.g. mild alkaline hydrolytic methods or, preferably, microbiologically utilizing *Flavobacterium dehydrogenans* (ATCC 13930) according to procedures known in the art.

By "mild alkaline hydrolytic means" is contemplated reaction media containing a hydroxyl ion (such as supplied by alkali metal carbonates or hydroxides) in an aqueous media, e.g. in aqueous methanol: or media containing an alkoxide ion (such as supplied by alkali metal alkoxide) in anhydrous alkanols, e.g. anhydrous methanol.

When hydrolyzing the 11-acetate ester by means of *Flavobacterium dehydrogenans* (ATCC 13930), all other acetate groups present in the molecule will also be hydrolyzed; similarly, when hydrolyzing under mild alkaline hydrolytic media, all other primary and escondary hydroxyl groups will be hydrolyzed and, depending on the hydrolytic conditions, some tertiary esters may be hydrolyzed.

In turn, any hydroxy group present in a 6-azido-11β-hydroxy-4,6-pregnadiene thus prepared may be esterified utilizing neutral or basic acylating reagents according to prcedures known in the art.

When utilizing an 11-formate ester in our improvement process, the 11-formate esters are conveniently prepared by known procedures utilizing formic acid in the presence of p-toluenesulfonic acid. Under these conditions, all primary, secondary and tertiary hydroxyl groups in the 6α,7α-oxido-4-pregnene will also be esterified and will remain unchanged throughout the process but, when desired, can be easily hydrolyzed at room temperature by means of dilute sodium hydroxide in methanol. The 11-formate ester is preferably introduced in the molecule prior to the 6α,7α-oxido group since under the condition necessary to prepare the 11-formate ester, fission of the 6α,7α-oxido will occur with formation of undesirable side products. Thus, for example, 9α-fluoro-16α-methyl-4,6-pregnadiene-11β, 17α,21-triol-3,20-dione 21-acetate upon treatment with formic acid in the presence of catalytic quantities of p-toluenesulfonic acid yields the corresponding 11,17-diformate which, upon treatment with monoperphthalic acid in methylene chloride produces the requisite 6α,7α-oxido-11β-formyloxy starting compound for our process, i.e. 6α,7α-oxido-9α-fluoro-16α-methyl-4-pregnene-11α,17α,21-triol-3,20-dione 11,17-diformate 21-acetate. Reaction of the foregoing with sodium azide yields 6β-azido-7α-hydroxy - 9α - fluoro-16α-methyl-4-pregnene-11β,17α,21-triol-3,20-dione 11,17-diformate 21-acetate. Treatment thereof with acetic anhydride in pyridine (preferably in the presence of 4-dimethylaminopyridine) yields the corresponding 7α-acetate ester which upon reaction with tetramethylammonium fluoride in acetonitrile or with concentrated hydrochloric acid in aqueous dioxane will yield 6-azido-9α-fluoro-16α-methyl-4,6-pregnadiene-11β,17α,21-triol-3,20-dione 11,17 - diformate 21-acetate. Hydrolysis therdeof with dilute aqueous sodium hydroxide in methanol at room temperature yields 6-azido - 9α - fluoro-16α-methyl-4,6-pregnadiene-11β,17α, 21 - triol - 3,20-dione having enhanced anti-inflammatory activity.

11-halogenoacetate ester starting compounds of our process are conveniently prepared from the corresponding 11β-hydroxy compounds by treatment with the corresponding acid anhydride in pyridine. Thus, for example, 6α,7α-oxido-9α-fluoro - 16α - methyl-4-pregnene-11β,17α, 21-triol-3,20-dione 21-acetate, when treated with chloroacetic anhydride or trichloroacetic anhydride in pyridine at room temperature according to known procedure is converted to the corresponding 11-ester, e.g. the 11-chloroacetate and 11-trichloroacetate, respectively. The aforementioned 11-chloroacetate esters remain unchanged throughout the transformations outlined in Chart A, and after preparation of 6-azido-11-haloalkanoyloxy-4,6-pregnadiene, e.g. the 11-chloroacetate and the 11-trichloroacetate, respectively, of 6-azido-9α-fluoro-16α-methyl-4,6-pregnadiene-11β,17α,21 - triol - 3,20-dione 21-acetate, the 11-halogenoacetate ester is conveniently hydrolyzed with dilute aqueous sodium hydroxide in methanol together with any 21-ester which may be present.

The halogenoacetate ester preferred for use in our process is the 11-trifluoroacetate ester which is conveniently prepared from the corresponding 11β-hydroxy-4-pregnene of Formula A, Chart A, by reaction with one molar equivalent of trifluoroacetic anhydride in pyridine at −10° C.

When carrying out our improvement process utilizing an 11-trifluoroacetate ester of a 6α, 7α-oxido compound of Formula A, Chart A, as starting compound, it is necessary that the step of opening 6α,7α-oxido function utilizing sodium azide in aqueous methanol be carried out in neutral or slightly acidic media since, even under slightly alkaline conditions, the 11-trifluoroacetic acid ester will hydrolyze with the resulting disadvantage of the prior art process discussed hereinabove. The reaction mixture of the 6α,7α-oxido steroid and sodium azide in aqueous methanol is kept slightly acid by the addition of small quantities of acetic acid.

When utilizing an 11-trifluoroacetate ester of an 11β-hydroxy-4-pregnene-3,20-dione in our process, after conversion of a 6α,7α-oxido-11β-trifluoroacetoxy-4-pregnene-17α,21-diol-3,20-dione 21-acetate to the corresponding 6β-azido-7α-hydroxy derivative as discussed hereinabove, the 7α-hydroxy is preferentially converted to the 7α-acetate ester. By varying the conditions of the acetylation, one can obtain either an 11β-hydroxy-6β-azido-7α-acetoxy derivative or a 6β-azido-7α-11β-diacetate derivative. For example, treatment of 6β-azido - 7α - hydroxy-9α-fluoro-11β - trifluoroacetoxy - 16α - methyl-4-pregnene-17α,21-diol-3,20-dione 21-acetate with an equimolar quantity of acetic anhydride in pyridine will yield the corresponding 6β-azido - 7α - acetoxy-11β-hydroxy intermediate which, upon treatment wtih tetramethylammonium fluoride will yield the pharmacologically active 11β-hydroxy steroid, e.g. 6 - azido - 9α - fluoro - 16α - methyl-4,6-pregnadiene-11β,17α,21-triol-3,20-dione 21-acetate. By this method there is thus advantageously eliminated the additional step of hydrolyzing the 11-ester.

Alternatively, when a molar excess of acetic anhydride is employed, and 4-dimethylaminopyridine is used alone or together with pyridine, the 6β-azido-7α-hydroxy-11β-trifluoroacetoxy-4-pregnene intermediate is converted to the corresponding 7,11-diacetate, which, upon deacetoxylation according to our process will yield a 6-azido-11β-acetoxy-4,6-pregnadiene of Formula I, e.g. 6-azido-9α-fluoro-11β-acetoxy - 16α - methyl-4,6-pregnadiene-17α,21-diol - 3,20 - dione 21-acetate. Hydrolysis thereof either chemically or microbiologically will then yield the corresponding 11,21-diol of Formula III, Chart A, having anti-inflammatory activity, e.g. 6-azido - 9α - fluoro-16α-methyl-4,6-pregnadiene-11β,17α,21-triol-3,20-dione.

In our improved process, the 6-azido-11β-alkanoyloxy-4,6-pregnadiene-3,20-dione having a cortical side chain at C–21 is convertible to the corresponding C–21-unsubstituted-11β-lower alkanoyloxy progesterone compound or to a therapeutically active 21-bromo-, 21-chloro- or 21-fluoro derivative thereof utilizing known methods. Thus, 6 - azido-9α-fluoro-6-dehydro-hydrocortisone-11,21-diacetate upon selective hydrolysis with potassium bicarbonate in aqueous methanol yields the corresponding 11-acetate-21-ol which upon treatment with methanesulfonyl chloride in pyridine produces the corresponding 11-acetate 21 methanesulfonate. Treatment of the foregoing with sodium iodide in acetone followed by reduction of the thereby formed 11-acetate-21-iodo derivatives yields the corresponding 11β-acetoxyprogesterone derivative, e.g. 6-azido - 9α - fluoro-11β-acetoxy - 4,6 - pregnadiene-17α,ol-3,20-dione. Hydrolysis thereof by means of *Flavobacterium dehydrogenans* yields 6-azido-9α-fluoro-4,6-pregnadiene-11β,17α-diol-3,20-dione:

Alternatively, the 11β-acetoxy-21-iodo derivatives are convertible to other pharmacologically active 21-halogeno-4,6-pregnadienes. For example, 6-azido-9α-fluoro-21-iodo-11β-acetoxy - 4,6 - pregnadiene-17α,ol-3,20-dione upon treatment with silver fluoride in moist acetonitrile will yield the corresponding 21-fluoro derivative which upon hydrolysis of the 11-acetate ester yields 6-azido-9α,21-difluoro-4,6-pregnadiene-11β,17α-diol having topical anti-inflammatory activity.

The following examples are illustrative of the procedure employed in carrying out the process of this invention but are not to be construed as limiting the scope thereof, the scope of the invention being defined only by the appended claims.

PREPARATION 1

6α,7α-oxido-9α-fluoro-16-methyl-4-pregnene-11β,17α,21-triol-3,20-dione 11,21-diacetate (A) 9α-fluoro-16-methyl-4,6-pregnadiene-11β,17α,21-triol-3,20-dione 21-acetate (1) Add 10.2 g. of dichlorodicyanobenzoquinone to 12 g. of 9α-fluoro - 16α - methyl-4-pregnene-11β,17α,21-triol-3,20-dione 21-acetate in 600 ml. of dioxane, then bubble in anhydrous hydrogen chloride with stirring for 5 minutes. Continue stirring at ambient temperature for 2.5 hours. Filter the reaction mixture and evaporate in vacuo to a residue comprising 9α-fluoro-16α-methyl-4,6-pregnadiene-11β,17α,21-triol-3,20-dione 21-acetate. Purify by dissolving the residue in ethyl acetate, wash the ethyl acetate solution with dilute sodium hydroxide, then with water. Dry the organic solution over magnesium sulphate, filter, then evaporate in vacuo to a residue. Crystallize the residue from acetone-hexane to give 9α-fluoro-16α-methyl-4,6-pregnadiene - 11β,17α,21 - triol-3,20-dione 21-acetate.

(2) In similar manner, treat 9α-fluoro-16β-methyl-4-pregnene - 11β,17α,21 - triol - 3,20 - dione 21-acetate with dichlorodicyanobenzoquinone and anhydrous hydrogen chloride in dioxane at room temperature. Isolate and purify the resultant product in the manner described to obtain 9α - fluoro-16β-methyl-4,6-pregnadiene-11β,17α,21-triol-3,20-dione 21-acetate.

(B) 6α,7α-oxido-9α-fluoro-16-methyl-4-pregnene-11β,17α,21-triol-3,20-dione 21-acetate (1) To 13 g. of 9α-fluoro-16α-methyl-4,6-pregnadiene-11β,17α,21-triol-3,20-dione 21-acetate in 390 ml. of methylene chloride, add a solution of 15.6 g. of monoperphthalic acid in 150 ml. of ether. Stir at room temperature for 72 hours, then add 1.5 g. of monoperphthalic acid in 15 ml. of ether. Continue stirring for 7 days, then add 20 g. of sodium bisulfite in 80 ml. of water. Stir 10–15 minutes. Wash the ethereal solution with 2 N sodium hydroxide until the wash water remains clear. Dry the ethereal solution over sodium sulphate, then concentrate to a residue comprising 6α,7α-oxido-9α-fluoro-16-methyl-4-pregnene-11β,17α,21-triol-3,20-dione 21-acetate. Purify by crystallizing from acetone/ether;

$[\alpha]_D^{26°} + 86.2°$ (dioxane); $\lambda_{max.}^{methanol}$ 235 mμ ($\epsilon$=14,300)

(2) In similar manner, treat 9α-fluoro-16β-methyl-4,6-pregnadiene-11β,17α,21-triol-3,20-dione 21-acetate with monoperphthalic acid in methylene chloride to obtain 6α,7α- - oxido - 9α - fluoro-16β-methyl-4-pregnene-11β,17α,21-triol-3,20-dione 21-acetate.

(C) 6α,7α,-oxide-9α-fluoro-16-methyl-4-pregnene-11β,17α,21-triol-3,20-dione 11,21-diacetate (1) To a solution of 3 g. of 6α,7α-oxido-9α-fluoro-16α - methyl - 4 - pregnene - 11β,17α,21-triol-3,20-dione 21-acetate in 30 ml. of pyridine, add 6 ml. of acetic anhydride and 150 mg. of 4-dimethylaminopyridine. Allow the reaction mixture to stay at room temperature for 18 hours. Add 10 ml. of water dropwise to the reaction mixture, then pour the reaction mixture into 600 ml. of cold water with stirring. Collect the resultant precipitate by filtration, wash the precipitate with water, then dry in vacuo at 80° C. to give 3.13 g. (95.5% theoretical yield) of 6α,7α-oxido-9α-fluoro-16α-methyl-4-pregnene-11β,17α-21-triol-3,20-dione 11,21-diacetate;

$\lambda_{max.}^{methanol}$ 234 mμ ($\epsilon$=15,150); $[\alpha]_D^{26°} + 106.2°$ (dioxane)

(2) In similar manner, treat 6α,7α-oxido-9α-fluoro-16β-methyl-4-pregnene-11β,17α,21-triol-3,20-dione 21 - acetate with acetic anhydride in pyridine and 4-dimethylaminopyridine to obtain 6α,7α-oxido-9α-fluoro-16β-methyl-4-pregnene-11β,17α,21-triol-3,20-dione 11,21-diacetate;

$\lambda_{max.}^{methanol}$ 233 mμ ($\epsilon$=14,850); $[\alpha]_D^{26°} + 116.2°$ (dioxane)

Alternatively, the compounds of this example are also prepared by following procedures D and E.

(D) 9α-fluoro-16-methyl-4,6-pregnadiene-11β,17α,21-triol-3,20-dione 11,21-diacetate (1) To a solution of 868 mg. 9α-fluoro-16α-methyl-4,6-pregnadiene - 11β,17α,21 triol - 3,20-dione 21-acetate in 5 ml. of acetic anhydride, add 5 ml. of pyridine and stir at 50° C. for 72 hours. Cool the mixture slightly, then add about 10 ml. of water, then pour the reaction mixture into 90 ml. of cold water. Collect the resultant precipitate by filtration, wash the precipitate with water, then dry in vacuo to obtain 940 mg. of 9α-fluoro-16α-methyl-4,6-pregnadiene-11β,17α,21-triol-3,20-dione 11,21-diacetate;

$\lambda_{max.}^{Nujol}$ 2.9, 5.68, 5.72, 5.8, 6.08, 6.18, 6.3, 8.12, 11.1μ

(2) Alternatively, the compound of this preparation is prepared as follows: To a solution of 86 mg. of 9α-fluoro - 16α - methyl - 4,6-pregnadiene-11β,17α,21-triol-3,20-dione 21-acetate in 0.5 ml. of acetic anhydride and 0.5 ml. of pyridine, add 4 mg. of 4-dimethylaminopyridine. Allow the reaction mixture to stand at room temperature for 3 hours, then add about 1 ml. of water. Pour the reaction mixture into 10 ml. of cold water and collect the resultant precipitate by filtration. Dry the precipitate in vacuo to obtain 74 mg. of 9α-fluoro-16α-methyl - 4,6 - pregnadiene - 11β,17α,21-triol-3,20-dione 11,21-diacetate.

(3) In similar manner, treat 9α-fluoro-16β-methyl-4,6-pregnadiene-11β,17α,21-triol-3,20-dione 21-acetate with acetic anhydride in pyridine and dimethylaminopyridine to obtain 9α-fluoro-16β-methyl-4,6-pregnadiene-11β,17α, 21-triol-3,20-dione 11,21-diacetate;

$\lambda_{max.}^{Nujol}$ 2.9, 4.72, 5.72, 5.80, 5.95, 6.0, 6.18, 6.27 and 8.1μ

In preparation 1–D (1, 2, and 3), the 21-hydroxy derivatives may be used as starting compounds instead of the 21-monoacetate esters and there will be formed the 11,21-diacetate products.

(E) 6α,7α-oxido-9α-fluoro-16-methyl-4-pregnene-11β, 17α,21-triol-3,20-dione, 11,21-diacetate (1) To a solution of 700 mg. of 9α-fluoro-16α-methyl-4,6-pregnadiene - 11β,17α,21 - triol - 3,20-dione 11,21-diacetate in 21 ml. of methylene chloride, add 8 ml. of a solution of monoperphthalic acid in ether (92–95 mg. monoperphthalic acid per ml. solution). Stir the reaction mixture at room temperature for 72 hours, then add 1 g. of sodium dihydrogenphosphate together with 8 ml. of ethyl acetate and 8 ml. of a solution of monoperphthalic acid in ether (92–95 mg. monoperphthalic acid per ml. solution). Warm the reaction mixture to reflux temperature and stir at reflux temperature for 24 hours. Add an additional 8 ml. of a solution of monoperphthalic acid in ether (92–95 mg. monoperphthalic acid per ml. of solution) and continue heating the solution at reflux temperature for 24 hours. Cool the reaction mixture to room temperature and stir at room temperature for an additional 6 days. Wash the reaction mixture successively with aqueous sodium bisulfite, 8% sodium hydroxide and water. Dry the solution over sodium sulphate, filter and evaporate in vacuo to a residue comprising 6α,7α-oxido-9α-fluoro - 16α - methyl - 4 - pregnene-11β,17α,21-triol-3,20-dione 11,21-diacetate (yield=401 mg.) Purify by crystallization from methanol to obtain 6α,7α-oxido-9α-fluoro-16α-methyl-4-pregnene-11β,17α,21-triol-3,20 dione 11,21-diacetate identical to the compound prepared in Preparation 1–C–1 hereinabove.

(2) In similar manner, treat 9α-fluoro-16β-methyl-4,6-pregnadiene - 11β,17α,21 - triol - 3,20 - dione 11,21-diacetate with monoperphthalic acid in methylene chloride to obtain 6α,7α - oxido - 9α - fluoro - 16β - methyl-4-pregnene-11β,17α,21-triol-3,20-dione 11,21-diacetate.

PREPARATION 2

9α-chloro- and 9α-bromo- derivatives of 6α,7α-oxido-16-methyl-4-pregnene-11β,17α,21-triol-3,20 - dione 11,21-diacetate (A) 9α-chloro- and 9α-bromo- derivatives of 16-methyl-4,6-pregnadiene-11β,17α,21-triol-3,20-dione 21-acetate In a manner similar to that described in Preparation 1–A–1, treat each of the following 9α - halogeno - 16-methyl-4-pregnenes with dichlorodicyanobenzoquinone and anhydrous hydrogen chloride in dioxane:

9α-chloro-16α-methyl-4-pregnene-11β,17α,21-triol-3,20-dione 21-acetate,
9α-chloro-16β-methyl-4-pregnene-11β,17α,21-triol-3,20-dione 21-acetate,
9α-bromo-16α-methyl-4-pregnene-11β,17α,21-triol-3,20-dione 21-acetate, and
9α-bromo-16β-methyl-4-pregnene-11β,17α,21-triol-3,20-dione 21-acetate.

Isolate and purify the resultant respective products in a manner similar to that described in Preparation 1–A–1 hereinabove to obtain, respectively, 9α-chloro-16α-methyl-4,6-pregnadiene-11β,17α,21-triol-3,20-dione 21-acetate,
9α-chloro-16β-methyl-4,6-pregnadiene-11β,17α,21-triol-3,20-dione 21-acetate,
9α-bromo-16α-methyl-4,6-pregnadiene-11β,17α,21-triol-3,20-dione 21-acetate, and
9α-bromo-16β-methyl-4,6-pregnadiene-11β,17α-21-triol-3,20-dione 21-acetate.

(B) 9α-chloro- and 9α-bromo- derivatives of 6α,7α-oxido-16 - methyl - 4 - pregnene-11β,17α,21-triol-3,20-dione 21-acetate Treat each of the 9α-halogeno-16-methyl-4,6-pregnadienes prepared in Preparation 2–A hereinabove with monoperphthalic acid in methylene chloride in a manner similar to that described in Preparation 1–B–1. Isolate and purify the resultant respective products in a manner similar to that described in Preparation 1–B–1 to obtain, respectively, 6α,7α-oxido-9α-chloro-16α-methyl-4-pregnene-11β,17α,21-triol-3,20-dione 21-acetate,
6α,7α-oxido-9α-chloro-16β-methyl-4-pregnene-11β,17α,21-triol-3,20-dione 21-acetate,
6α,7α-oxido-9α-bromo-16α-methyl-4-pregnene-11β,17α,21-triol-3,20-dione 21acetate, and
6α,7α-oxido-9α-bromo-16β-methyl-4-pregnene-11β,17α,21-triol-3,20-dione 21-acetate.

(C) 9α-chloro- and 9α-bromo- derivatives of 6α,7α-oxido-16 - methyl - 4 - pregnene-11β,17α,21-triol-3,20-dione 11,21-diacetate Treat each of the 6α,7α-oxido-9α-halogeno-16-methyl-4-pregnene derivatives prepared in Preparation 2–B hereinabove with acetic anhydride in pyridine together with 4-dimethylamino-pyridine at room temperature in a manner similar to that described in Preparation 1–C–1 hereinabove. Isolate and purify the resultant respective products in a manner similar to that described in Preparation 1–C–1 to obtain, respectively, 6α,7α-oxido-9α-chloro-16α-methyl-4-pregnene-11β,17α,21-triol-3,20-dione 11,21-diacetate,
6α,7α-oxido-9α-chloro-16β-methyl-4-pregnene-11β,17α,21-triol-3,20-dione 11,21-diacetate,
6α,7α-oxido-9α-bromo-16α-methyl-4-pregnene-11β,17α,21-triol-3,20-dione 11,21-diacetate, and
6α,7α-oxido-9α-bromo-16β-methyl-4-pregnene-11β,17α,21-triol-3,20-dione 11,21-diacetate.

PREPARATION 3

Other 6α,7α,oxido-11β-acetoxy-4-pregnene-3,20-dione intermediates

Other 6α,7α-oxido-11β-acetoxy-4-pregnene-3,20-diones utilized as starting compounds in the examples which follow are prepared in a manner similar to that described in Preparation 1.

PREPARATION 4

6α,7α-oxido-11β,17α-diformyloxy-21-acetoxy-4-pregnene-3,20-diones (A) 9α-fluoro-16α-methyl-4,6-pregnadiene-11β,17α,21-triol-3,20-dione 11,17-diformate 21-acetate (1) To a solution of 2.0 g. of 9α-fluoro - 16α - methyl-4,6 - pregnadiene - 11β,17α,21 - triol - 3,20 - dione 21-acetate in 30 ml. of formic acid (98–100%), add 200 mg. of p-toluenesulfonic acid. Stir at room temperature for 20 hours, then pour the reaction mixture into 600 ml. of cold water. Collect the resultant precipitate by filtration, wash the precipitate with water and air dry to give 9α-fluoro-16α - methyl - 4,6 - pregnadiene - 11β,17α,21 - triol-3,20-dione, 11,17-diformate 21-acetate.

(2) In similar manner treat each of 9α-fluoro-16β-methyl - 4,6 - pregnadiene - 11β,17α,21 - triol - 3,20-dione 21 - acetate and 4,6 - pregnadiene - 11β,17α,21-triol-3,20-dione 21-acetate with formic acid in the presence of p-toluenesulfonic acid to obtain, respectively, 9α-fluoro-16β-methyl - 4,6 - pregnadiene - 11β,17α,21 - triol - 3,20-dione 11,17-diformate 21-acetate, and 4,6-pregnadiene-11β,17α, 21-triol-3,20-dione 11,17-diformate 21-acetate.

(3) In the above procedures, by utilizing the free trihydroxy compound as starting material, there is obtained a corresponding triformate ester, i.e., 9α-fluoro-16α-methyl - 4,6 - pregnadiene - 11β,17α,21 - triol - 3,20-dione 11,17,21-triformate, and 9α - fluoro - 16β - methyl - 4,6-pregnadiene - 11β,17α,21 - triol - 3,20 - dione 11,17,21-triformate.

(B) 6α,7α - oxido - 9α - fluoro - 16α - methyl-4-pregnene 11β,17α,21-triol-3,20-dione 11,17-diformate 21-acetate (1) To a solution of 1 g. of 9α - fluoro - 16α - methyl-4,6-pregnadiene-3,20-dione 11,17-diformate 21-acetate in 50 ml. of methylene chloride, add a solution of 95 mg. monoperphthalic acid in 10 ml. of ether. Stir the reaction mixture at room temperature for 8 days, then filter the reaction mixture. Wash the filtrate with aqueous sodium bisulfate solution, then with three portions of dilute sodium hydroxide (3%) and finally with water. Dry the ethereal solution with sodium bisulfate and then concentrate to a residue comprising 6α,7α-oxido-9α-fluoro-16α-methyl - 4 - pregnene-11β,17α,21-triol-3,20-dione 11,17-diformate 21-acetate. Purify by recrystallization from acetone-hexane.

(2) In similar manner, treat each of the 11β-formyl-oxy-4,6-pregnadiene-3,20-diones prepared as described in Preparation 4-A-2 with monoperphthalic acid in methylene chloride. Isolate and purify the resultant respective products in a manner similar to that described to obtain, respectively.

6α,7α-oxido-9α-fluoro-16β-methyl-4-pregnene-11β,17α,21-triol-3,20-dione 11,17-diformate 21 acetate, and
6α,7α-oxido-4-pregnene-11β,17α,21-triol-3,20-dione 11,17-diformate 21-acetate.

(3) In similar manner, treat each of the 9α-fluoro-16-methyl-4,6-pregnadiene-11β,17α,21-triol-3,20-dione 11,17-21-triformates prepared in Example 4-A-3 with monoperphthalic acid in methylene chloride to obtain, respectively, 6α,7α-oxido-9α-fluoro-16α-methyl-4-pregnene-11β,17α,21-triol-3,20-dione 11,17,21-triformate, and
6α,7α-oxido-9α-fluoro-16β-methyl-4-pregnene-11β,17α,21-triol-3,20-dione 11,17,21-triformate.

PREPARATION 5

6α,7α-oxido-9α-fluoro-16-methyl-4-pregnene-11β,17α-21-triol-3,20-dione 11-trifluoroacetate 21-acetate To a solution of 100 mg. of 6α,7α-oxido-9α-fluoro-16α-methyl-4-pregnene-11β,17α,21-triol-3,20-dione 21-acetate in 1 ml. of pyridine at −10° C., add 0.4 ml. of trifluoroacetic anhydride. Allow the solution to stand at room temperature for two hours, then pour the reaction mixture into dilute aqueous hydrochloric acid containing 1.4 ml. of concentrated hydrochloric acid. Collect the resultant precipitate by filtration, wash the precipitate with water, then dry in vacuo at 80° C. to give 6α,7α-oxido-9α-fluoro-16α-methyl-4-pregnene-11β,17α,21-triol-3,20-dione 11-trifluoroacetate 21-acetate.

In similar manner treat 6α,7α-oxido-9α-fluoro-16β-methyl-4-pregnene-11β,17α,21-triol-3,20-dione 21-acetate with trifluoroacetic anhydride in pyridine at −10° C. there is obtained 6α,7α-oxido-9α-fluoro-16β-methyl-4-pregnene-11β,17α,21-triol-3,20-dione 11 - trifluoroacetate 21-acetate.

EXAMPLE 1

6-azido-9α-fluoro-16-methyl-4,6-pregnadiene-11β,17α,21-triol-3,20-dione (A) 6β-azido-9α-fluoro-16-methyl-4-pregnene-7α,11β,17α,21-tetrol-3,20-dione 11,21-diacetate (1) To a solution of 3.0 g. of 6α,7α-oxido-9α-fluoro-16α-methyl-4-pregnene-11β,17α,21-triol-3,20-dione 11,21-diacetate in 300 ml. of methanol and 30 ml. of water under an atmosphere of argon, add 9 g. of sodium azide followed by 9 ml. acetic acid and stir the reaction mixture in the absence of light at 30–35° C. under an argon atmosphere for 70 hours. Add an additional 3 g. of sodium azide and 3 ml. of acetic acid and continue stirring at 30–35° C. for an additional 44 hours. Evaporate the reaction mixture to a small volume in a current of nitrogen, then pour the residue into water. Saturate the resulting aqueous suspension with sodium chloride and separate the resultant precipitate by filtration, wash the precipitate with water, then dry the precipitate in vacuo at 50° C. to give 6β - azido-9α - fluoro-16-methyl-4-pregnene-7α,11β, 17α,21-tetrol-3,20-dione 11,21-diacetate; yield=2.96 g. (90.8% theory);

$\lambda_{max.}^{Nujol}$ 2.88, 4.75, 5.72, 5.80, 5.99, 6.0, 6.2μ

This product is used without further purification as starting compound in Example 1–B hereinbelow.

(2) In similar manner, treat 6α,7α,oxido-9α-fluoro-16β-methyl-4-pregnene-11β,17α,21-triol-3,20-dione 11,21-diacetate in aqueous methanol with sodium azide at 30–35° C. in the absence of light to obtain 6β-azido-9α-fluoro-16β-methyl-4-pregnene-7α,11β,17α,21-tetrol-3,20-dione 11,21-diacetate in 95.4% theoretical yield.

(B) 6β-azido-9α-fluoro-16-methyl-4-pregnene-7α,11β,17α,21-tetrol-3,20-dione 7,11,21-triacetate (1) To a solution of 2.8 g. of 6β-azido-9α-fluoro-16α-methyl-4-pregnene-7α,11β,17α,21-tetrol-3,20-dione 11,21-diacetate in 28 ml. of pyridine cooled to −15° C. and under an argon atmosphere, add 6 ml. of acetic anhydride and 150 mg. of 4-dimethylaminopyridine. Allow the reaction mixture to remain at 5° C. for 20 hours in the absence of light. Add a small amount of water, then pour the reaction mixture into 600 ml. of ice water. Saturate the aqueous mixture with sodium chloride, then separate the resultant precipitate by filtration. Wash the precipitate with water, dry in vacuo at 60° C. to give 2.51 g. (83% theory) 6β - azido - 9α - fluoro-16α-methyl-4-pregnene-7α, 11β,17α,21-tetrol-3,20-dione 7,11,21-triacetate;

$\lambda_{max.}^{methanol}$ 230 mμ (ε=11,100); $[\alpha]_D^{26}$ +54.8° (dioxane)

This compound is used without further purification as an intermediate in following Example 1-C.

(2) In similar manner, treat a pyridine solution of 6β-azido - 9α - fluoro - 16β - methyl - 4 - pregnene - 7α, 11β,17α-21-tetrol-3,20-dione 11,21-diacetate with acetic anhydride and dimethylaminopyridine to obtain 6β-azido-9α - fluoro-16β-methyl-4-pregnene-7α,11β,17α,21-tetrol-3, 20-dione 7,11,21-triacetate in 81.5% theoretical yield.

(C) 6-azido-9α-fluoro-16-methyl-4,6-pregnadiene-11β,17α, 21-triol-3,20-dione 11,21-diacetate (1) Concentrate to dryness in vacuo a solution of 4.8 g. of tetramethylammoniumfluoride penta-hydrate in 96 ml. of acetonitrile. Then add 2.4 g. of 6β-azido-9α-fluoro-16α-methyl - 4 - pregnene-11β,17α,21-tetrol-3,20-dione 7,11,21-triacetate and 96 ml. of acetonitrile. Stir the reaction mixture under an argon atmosphere in the absence of light and at room temperature for 40 hours. Pour the reaction mixture into one liter of cold water, saturate the aqueous mixture with sodium chloride and separate the resultant precipitate by filtration. Wash the precipitate with water and air dry to give 2.0 g. of a precipitate comprising 6-azido-9α-fluoro-16α-methyl-4,6-pregnadiene-11β, 17α,21-triol-3,20-dione 11,21-diacetate. Purify by dissolving in chloroform and chromatographing on 115 g. of Florisil (hexane washed). Develop the column by successively using 200 ml. portions of hexane, methylene chloride and 0.5% methanol in methylene chloride. Combine the 2nd and 3rd 0.5% methanol in methylene chloride fractions and evaporate to a residue comprising 0.53 g. of 6-azido-9α-fluoro-16α-methyl-4,6-pregnadiene-11β, 17α,21-triol-3,20-dione 11,21-diacetate;

$\lambda_{max.}^{methanol}$ 248 and 295 mμ (ε=13,500, 11,300);

$[\alpha]_D^{26}$ +116.2° (dioxane)

Additional product is obtained as follows: rechromatograph the first 0.5% methanol in methylene chloride fraction obtained from the first chromatographic procedure described hereinabove on 72 g. of hexane washed Florisil and develop the column using 100 ml. portions of hexane, 0.3% methanol methylene chloride (12 fractions) 0.6% methanol methylene chloride (2 fractions). Analyze each fraction by qualitative ultraviolet spectroscopy and thin layer chromatography and combine those like fractions comprising substantially 6-azido-9α-fluoro-16α-methyl-4,6-pregnadiene-11β,17α,21-triol-3,20-dione 11,21- diacetate. Evaporate the like fractions to a residue to give an additional 0.14 g. of product making the total yield of purified 6β - azido-9α-fluoro-16α-methyl-4,6-pregnadiene-11β,17α,21-triol-3,20-dione 11,21-diacetate=0.67 g. (31.1% theoretical yield).

(2) In similar manner, treat 6β-azido-9α-fluoro-16β-methyl-4-pregnene - 7α,11β,17α,21-tetrol-3,20-dione 7,11,21-triacetate in acetonitrile with tetramethylammonium-fluoride to obtain 6-azido-9α-fluoro-16β-methyl-4,6-pregnadiene-11β,17α,21-triol - 3,20 - dione 11,21-diacetate in 48.6% theoretical yield;

$\lambda_{max.}^{Nujol}$ 2.9, 4.72, 5.72, 5.80, 5.95, 6.0, 6.18, 6.27, 8.1μ

(D) 6-azido-9α-fluoro-16α-methyl-4,6-pregnadiene-11β,17α,21-triol-3,20-dione (1) Place in each of eight 300 ml. culture flasks 100 ml. of prepared medium composed of 10 g. Difco yeast extract, 4.49 g. of potassium dihydrogen phosphate and 8.84 g. of disodium hydrogen phosphate per 1000 ml. of sterile distilled water, add a 1 ml. inoculum of *Flavobacterium dehydrogenans*, var. hydrolyticum (ATCC 13930), and incubate at 30° C. on a rotary shaking machine. After a 24-hour growth period, add to each of the eight flasks a 2 ml. portion of a solution of 0.21 g. of 6-azido-9α-fluoro-16α-methyl-4,6-pregnadiene-11β,17α,21-triol-3,20-dione 11,21-diacetate in 16 ml. of ethanol and continue incubation for an additional 23 hours. At the end of the incubation period, pool the broths and extract with chloroform. Evaporate the combined extracts in vacuo to a residue. Dissolve the residue in 20 ml. of chloroform and percolate the chloroform solution through a chromatographic column containing 30 mg. of Florisil (hexane washed). Develop the column using chloroform and 5% methanol in chloroform. Combine the 5% methanol in chloroform eluates and evaporate in vacuo to a residue comprising 0.157 g. of 6-azido-9α-fluoro-16α-methyl-4,6-pregnadiene-11β,17α,21-triol-3,20-dione (88% theoretical yield). Purify by crystallization from acetone;

$\lambda_{max.}^{methanol}$ 249 and 296 mμ (ϵ=12,300 and 10,650); $[α]_D^{26°}$+ 109.1° (dioxane)

(2) In similar manner, subject 6-azido-9α-fluoro-16β-methyl-4,6-pregnadiene-11β,17α,21-triol-3,20-dione 11,21-diacetate to the action of *Flavobacterium dehydrogenans*, var. Hydrolyticum (ATCC 13930); isolate and purify the resultant product in a manner similar to that described to obtain 6-azido-9α-fluoro-16α-methyl-4,6-pregnadiene-11β,17α,21-triol-3,20-dione;

$\lambda_{max.}^{Nujol}$ 2.95, 4.75, 5.86, 6.02, 6.2, 6.31μ

EXAMPLE 2

6β-azido-9α-fluoro-16α-methyl-4-pregnene-7α,11β,17α,21-tetrol-3,20-dione 21-acetate Add 9 g. of sodium azide and 9 ml. of acetic acid to a solution of 1.5 g. of 6α,7α-oxido-9α-fluoro-16α-methyl-4-pregnene-11β,17α,21-triol-3,20-dione 21-acetate in 225 ml. of methanol and 45 ml. of water under an atmosphere of argon. Stir the reaction mixture at room temperature in the absence of light for 5 days. Add an additional 1.5 g. of sodium azide and 1.5 ml. of acetic acid and continue stirring at room temperature under an atmosphere of argon for an additional 5 days. Evaporate the reaction mixture in a stream of nitrogen and slurry the resultant residue with water, then extract with ethyl acetate. Wash the combined extracts with water, dry the combined ethyl acetate extracts over sodium sulphate, and evaporate in vacuo to a residue (2.1 g.). Dissolve the residue in chloroform and place on 10 preparative chromatographic plates (10″ x 10″ and containing a 2000μ thickness of silica-gel). Dry the plates at room temperature using nitrogen gas, then develop the plates in a glass tank containing chloroform-ethyl acetate (2:1) solvent system. Remove the more polar zone of the resulting two zones and extract repeatedly with portions of warm chloroform and warm ethyl acetate. Evaporate the combined extracts to a residue (600 mg.). Dissolve the residue in chloroform and rechromatograph on silica-gel chromatographic plates, dried and developed in the same manner as described hereinabove. Extract the resulting two zones separately with successive portions of warm chloroform followed by ethyl acetate. Concentrate the combined extracts of each zone to dryness: Zone A=220 mg. and Zone B=90 mg. Identify each zone by thin layer chromatography; if thin layer chromatograph identifies each zone as a mixture of compounds, combine the zones in chloroform and rechromatograph on thick silica-gel plates. Develop the plates with chloroform-ethyl acetate (2:1) until a separation into three zones is obtained. Extract the middle zone with successive portions of hot chloroform, ethyl acetate and acetone, combine the eluates and evaporate to a residue comprising 40 mg. (2.45% theory) of 6β-azido-9α-fluoro-16α-methyl-4-pregnene-7α,11β,17α,21-tetrol - 3,20-dione 21-acetate;

$\lambda_{max.}^{methanol}$ 234 mμ (ϵ=11,000);

$\lambda_{max.}^{Nujol}$ 2.88, 2.9, 4.75, 5.73, 5.75, 6.0, 6.15, 8.05μ

EXAMPLE 3

6-azido-9α-chloro-16-methyl - 4,6 - pregnadiene - 11β,17α,21-triol-3,20-dione and 6-azido-9α-bromo-16-methyl-4,6-pregnadiene-11β,17α,21-triol-3,20-dione (A) 9α-chloro - and 9α-bromo-derivatives of 6β-azido-16-methyl-4-pregnene - 7α,11β,17α,21 - tetrol - 3,20 - dione 11,21-diacetate In a manner similar to that described in Example 1–A–1, treat each of the following 6α,7α-oxido-9α-halogeno-11β-acetoxy-4-pregnenes with sodium azide in aqueous methanol under an atmosphere of argon:

6α,7α-oxido-9α-chloro-16α-methyl-4-pregnene-11β,17α,21-triol-3,20-dione 11,21-diacetate,
6α,7α-oxido-9α-chloro-16β-methyl-4-pregnene-11β,17α,21-triol-3,20-dione 11,21-diacetate,
6α,7α-oxido-9α-bromo-16α-methyl-4-pregnene-11β,17α,21-triol-3,20-dione 11,21-diacetate, and
6α,7α-oxido-9α-bromo-16β-methyl-4-pregnene-11β,17α,21-triol-3-,20-dione 11,21-diacetate.

Isolate and purify the resultant respective products in a manner similar to that described in Example 1–A–1 to obtain, respectively, 6β-azido-9α-chloro-16α-methyl-4-pregnene-17α,11β,17α,21-tetrol-3,20-dione 11,21-diacetate,
6β-azido-9α-chloro-16β-methyl-4-pregnene-7α,11β,17α,21-tetrol-3,20-dione 11,21-diacetate,
6β-azido-9α-bromo-16α-methyl-4-pregnene-7α,11β,17α,21-tetrol-3,20-dione 11,21-diacetate, and
6β-azido-9α-bromo-16β-methyl-4-pregnene-7α,11β,17α,21-tetrol-3,20-dione 11,21-diacetate.

(B) 9α-chloro- and 9α-bromo-derivatives of 6β-azido-16-methyl-4-pregnene-7α,11β,17α,21 - tetrol - 3,20 - dione 7,11,21-triacetate In a manner similar to that described in Example 1–B–1, treat each of the 6β-azido-7α-hydroxy-9α-halogeno-16-methyl-4-pregnenes prepared in Example 3–A with acetic anhydride in pyridine under an atmosphere of argon. Isolate and purify the resultant respective products in a manner similar to that described in Example 1–B–1 to obtain, respectively, 6β-azido-9α-chloro-16α-methyl-4-pregnene-7α,11β,17α,21-tetrol-3,20-dione 7α,11β,21-triacetate,
6β-azido-9α-chloro-16β-methyl-4-pregnene-7α,11β,17α,21-tetrol-3,20-dione 7α,11β,21-triacetate,
6β-azido-9α-bromo-16α-methyl-4-pregnene-7α,11β,17α,21-tetrol-3,20-dione 7α,11β,21-triacetate, and
6β-azido-9α-bromo-16β-methyl-4-pregnene-7α,11β,17α,21-tetrol-3,20-dione 7α,11β,21-triacetate.

(C) 9α-chloro- and 9α-bromo-derivatives of 6-azido-16-methyl-4,6-pregnadiene-11β,17α,21 - triol - 3,20 - dione 11,21-diacetate In a manner similar to that described in Example 1–C, treat each of the 6β-azido-7α-acetoxy-9α-halogeno-16-methyl-4-pregnenes prepared in Example 3–B with tetramethylammonium fluoride pentahydrate in acetonitrile. Isolate and purify the resultant respective products in a manner similar to that described in Example 1–C to obtain, respectively, 6-azido-9α-chloro-16α-methyl-4,6-pregnadiene-11β,17α, 21-triol-3,20-dione 11,21-diacetate,
6-azido-9α-chloro-16β-methyl-4,6-pregnadiene-11β,17α, 21-triol-3,20-dione 11,21-diacetate,
6-azido-9α-bromo-16α-methyl-4,6-pregnadiene-11β,17α, 21-triol-3,20-dione 11,21-diacetate, and
6-azido-9α-bromo-16β-methyl-4,6-pregnadiene-11β,17α, 21-triol-3,20-dione 11,21-diacetate.

(D) 9α-chloro- and 9α-bromo-derivatives of 6-azido-16-methyl-4,6-pregnadiene-11β,17α,21-triol-3,20-dione In a manner similar to that described in Example 1–D–1, subject each of the 6-azido-11β,21-diacetoxy-16-methyl-4,6-pregnadienes prepared in Example 3–C to the action of the microorganisms *Flavobacterium dehydrogenans* var. Hydrolyticum (ATCC 13930). Isolate and purify the resultant respective products in a manner similar to that described in Example 1–D–1 to obtain, respectively, 6-azido-9α-chloro-16α-methyl-4,6-pregnadiene-11β,17α, 21-triol-3,20-dione,
6-azido-9α-chloro-16β-methyl-4,6-pregnadiene-11β,17α, 21-triol-3,20-dione,
6-azido-9α-bromo-16α-methyl-4,6-pregnadiene-11β,17α, 21-triol-3,20-dione, and
6-azido-9α-bromo-16β-methyl-4,6-pregnadiene-11β,17α, 21-triol-3,20-dione.

EXAMPLE 4

6-azido-4,6-pregnadiene-11β,17α,21-triol-3,20-dione 21-acetate (A) 6β-azido-4-pregnene-7α,11β,17α,21-tetrol-3,20-dione 11,21-diacetate To a stirred solution of 100 mg. of 6α,7α-oxido-4-pregnene-11β,17α,21-triol-3,20-dione 11,21-diacetate in 4 ml. of methanol, 2 ml. of dioxane, and 1 ml. of water, add 300 mg. of sodium azide followed by 0.3 ml. of acetic acid. Stir the reaction mixture in the absence of light at 30–35° for 18 hours. (After three hours of reaction time, an aliquot of the reaction mixture analyzed by thin layer chromatography and infra-red spectroscopy indicates about 30% conversion of the 6α,7α-oxido-4-pregnene to the 6β-azido-7α-hydroxy-4-pregnene.) Add 10 ml. of water to the reaction mixture, then evaporate the mixture in a current of nitrogen to a crystalline mass comprising 6β-azido-4-pregnene - 7α,11β,17α,21-tetrol-3,20-dione 11,21-diacetate. Collect by filtration the crystalline mass, wash with water, then dry the residue in vacuo to give 98 mg. (90% theory) of 6β-azido-4-pregnene-7α,11β,17α,21-tetrol-3,20-dione 11,21-diacetate;

$\lambda_{max.}^{methanol}$ 233 mμ (ε=11,700); $[\alpha]_D^{26°}$ +102.1° (dioxane)

This product is used without further purification as starting compound in Example 4–B hereinbelow.

(B) 6β-Azido-4-pregnene-7α,11β,17α,21-tetrol-3,20-dione 7,11,21-esters (1) The 7,11,21-triacetate.—In a manner similar to that described in Example 1–B, treat 6β-azido-4-pregnene-7α,11β,17α,21-tetrol-3,20-dione 11,21-diacetate with acetic anhydride in pyridine in the presence of 4-dimethylaminopyridine. Isolate and purify the resultant product in a manner similar to that described to obtain 6β-azido-4-pregnene-7α,11β,17α,21-tetrol-3,20-dione 7,11,21-triacetate.

(2) The 7-methanesulfonate 11,21-diacetate.—To a solution of 3 g. of 6β-azido-4-pregnene-7α,11β,17α,21-tetrol-3,20-dione 11,21-diacetate in 30 ml. of pyridine, add 1.5 ml. of methanesulfonyl chloride. Allow the reaction mixture to stand at room temperature for 17 hours, then pour the reaction mixture into cold water and collect by filtration the resultant precipitate comprising 6β-azido-4-pregnene-7α,11β,17α,21-tetrol-3,20-dione 7 - methanesulfonate 11,21-diacetate. Dry the precipitate in vacuo and use without further purification in the procedure of Example 4–C.

In the above procedure, by utilizing 1.8 g. of p-toluenesulfonyl chloride in place of the 1.5 ml. of methane-sulfonyl chloride, there is obtained the corresponding 7-p-toluenesulfonate ester.

(C) 6 - azido - 4,6 - pregnadiene - 11β,17α,21 - triol-3,20-dione 11,21-diacetate.—In a manner similar to that described in Example 1–C, treat each of 6β-azido-4-pregnene-7α,11β,17α,21-tetrol-3,20-dione 7,11,21 - triacetate and 6β-azido-4-pregnene-7α,11β,17α,21-tetrol-3,20-dione 7-methanesulfonate 11,21-diacetate with tetramethylammonium fluoride pentahydrate in acetonitrile. Isolate and purify the respective resultant products in a manner similar to that described in Example 1–C to obtain, from both starting compounds, 6-azido-4,6-pregnadiene-11β, 17α,21-triol-3,20-dione 11,21-diacetate.

(D) 6-azido-4,6-pregnadiene-11β,17α,21-triol-3,20-dione

In a manner similar to that described in Example 1–D, subject 6 - azido - 4,6-pregnadiene-11β,17α,21-triol-3,20-dione 11,21-diacetate to the action of *Flavobacterium dehydrogenans*. Isolate and purify the resultant product in a manner similar to that described in Example 1–D to obtain 6-azido-4,6-pregnadiene-11β,17α,21-triol-3,20-dione.

(E) 6-azido-4,6-pregnadiene-11β,17α,21-triol-3,20-dione 21-acetate

Add 0.2 ml. of acetic anhydride to a solution of 100 mg. of 6β-azido-4,6-pregnadiene-11β,17α,21-triol-3,20-dione in 1 ml. of pyridine and allow the reaction mixture to stand at room temperature for 18 hours. Pour the reaction mixture into 100 ml. of ice water and stir for 20 minutes. Collect the insoluble fraction by filtration, dry in vacuo and crystallize from acetone to obtain 6-azido-4,6-pregnadiene-11β,17α,21-triol-3,20-dione 21-acetate;

$\lambda_{max.}^{methanol}$ 251 mμ (ε=12,452); $\lambda_{max.}^{methanol}$ 299 mμ (ε=12,452); δ (CDCl$_3$), 0.73, 1.31, 2.15, 3.38, 4.66, 5.13, 5.78, 6.12 ppm; $[\alpha]_D^{26°}$ +205° (dioxane)

EXAMPLE 5

6β-azido-4-pregnene-7α,11β,17α,21-tetrol-3,20-dione 21-acetate

To a solution of 100 mg. of 6α,7α-oxido-4-pregnene-11β,17α,21-triol-3,20-dione 21-acetate in 2 ml. dioxane and 4 ml. methanol, add a solution of 300 mg. of sodium azide in 1 ml. of water and 0.2 ml. of acetic acid. Allow the reaction mixture to stand at room temperature. At the end of 18 hours an aliquot of the reaction mixture analyzed by thin layer chromatography and infra-red spectroscopy indicated about 30% conversion of the 6α,7α-oxido-4-pregnene to the 6-azido-7α-hydroxy-4-pregnene. Allow the reaction mixture to remain at room temperature for 4 days, then pour the reaction mixture into water and extract with chloroform. Dry the chloroform solution over magnesium sulphate and evaporate the solution to a residue comprising 6β-azido-4-pregnene-7α,11β,17α,21-triol-3, 20-dione 21-acetate; yield=75 mg. (68% theory). Purity by recrystallization from ethyl ether, $[\alpha]_D^{26°}$ +91° (dioxane).

EXAMPLE 6

6-azido-9α-halogeno-11β-hydroxy-4,6-pregnadiene-3,20-diones (A) 6β-azido-7α-hydroxy-9α-halogeno-11β-acetoxy-4-pregnene-3,20-diones In a manner similar to that described in Example 1-A, treat each of the following 6α,7α-oxido-9α-halogeno-11β-acetoxy-4-pregnene-3,20-diones with sodium azide in aqueous methanol under an atmosphere of argon in the absence of light:

(1) 6α,7α-oxido-9α-fluoro-4-pregnene-11β,17α,21-triol-3,20-dione 11,21-diacetate,
(2) 6α,7α-oxido-9α-chloro-4-pregnene-11β,17α,21-triol-3,20-dione 11,21-diacetate,
(3) 6α,7α-oxido-9α-bromo-4-pregnene-11β,17α,21-triol-3,20-dione 11,21-diacetate,
(4) 6α,7α-oxido-9α-fluoro-16-methylene-4-pregnene-11β,17α,21-triol-3,20-dione 11,21-diacetate,
(5) 6α,7α-oxido-9α-chloro-16-methylene-4-pregnene-11β,17α,21-triol-3,20-dione 11,21-diacetate,
(6) 6α,7α-oxide-9α-bromo-16-methylene-4-pregnene-11β,17α,21-triol-3,20-dione 11,21-diacetate,
(7) 6α,7α-oxido-9α-fluoro-4-pregnene-11β,16α,17α,21-tetrol-3,20-dione 11,16,21-triacetate,
(8) 6α,7α-oxido-9α-fluoro-16α,17α-isopropylidenedioxy-4-pregnene-11β,21-diol-3,20-dione 11,21-diacetate,
(9) 6α,7α-oxido-9α-fluoro-16α,17α-isobutylidenedioxy-4-pregnene-11β,21-diol-3,20-dione 11,21-diacetate,
(10) 6α,7α-oxido-9α-fluoro-17α,21-isopropylidenedioxy-4-pregnene-11β-ol-3,20-dione 11-acetate,
(11) 6α,7α-oxido-9α-fluoro-16α-methyl-17α,21-isopropylidenedioxy-4-pregnene-11β-ol-3,20-dione 11-acetate,
(12) 6α,7α-oxido-9α-fluoro-16β-methyl-17α,21-isopropylidenedioxy-4-pregnene-11β-ol-3,20-dione 11-acetate,
(13) 6α,7α-oxido-9α-fluoro-16-methylene-17α,21-isopropylidenedioxy-4-pregnene-11β-ol-3,20-dione 11-acetate,
(14) 6α,7α-oxido-9α-bromo-16-fluoromethylene-4-pregnene-11β,17α,21-triol-3,20-dione 11,21-diacetate,
(15) 6α,7α-oxido-9α-fluoro-16-methylene-4-pregnene-11β,17α-diol-3,20-dione 11,17-diacetate,
(16) 6α,7α-oxido-9α-fluoro-16-chloromethylene-4-pregnene-11β,17α-diol-3,20-dione 11,17-diacetate,
(17) 6α,7α-oxido-9α-fluoro-16α,17α-isopropylidenedioxy-4-pregnene-11β-ol-3,20-dione 11-acetate,
(18) 6α,7α-oxido-9α-fluoro-16α-methyl-4-pregnene-11β,17α-diol-3,20-dione 11,17-diacetate,
(19) 6α,7α-oxido-9α-fluoro-16β-methyl-4-pregnene-11β,17α-diol-3,20-dione 11,17-diacetate,
(20) 6α,7α-oxido-9α,21-difluoro-4-pregnene-11β,17α-diol-3,20-dione 11-acetate,
(21) 6α,7α-oxido-9α,21-difluoro-16α-methyl-4-pregnene-11β,17α-diol-3,20-dione 11-acetate, and
(22) 6α,7α-oxido-9α,21-difluoro-16β-methyl-4-pregnene-11β,17α-diol-3,20-dione 11-acetate.

Isolate and purify each of the resultant respective products in a manner similar to that described in Example 1-A to obtain, respectively, (1) 6β-azido-9α-fluoro-4-pregnene-7α,11β,17α,21-tetrol-3,20-dione 11,21-diacetate,
(2) 6β-azido-9α-chloro-4-pregnene-7α,11β,17α,21-tetrol-3,20-dione 11-21-diacetate,
(3) 6β-azido-9α-bromo-4-pregnene-7α,11β,17α,21-tetrol-3,20-dione 11,21-diacetate,
(4) 6β-azido-9α-fluoro-16-methylene-4-pregnene-7α,11β,17α,21-tetrol-3,20-dione 11,21-diacetate,
(5) 6β-azido-9α-chloro-16-methylene-4-pregnene-7α,11β,17α,21-tetrol-3,20-dione 11,21-diacetate,
(6) 6β-azido-9α-bromo-16-methylene-4-pregnene-7α,11β,17α,21-tetrol-3,20-dione 11,21-diacetate,
(7) 6β-azido-9α-fluoro-4-pregnene-7α,11β,16α,17α,21-pentol-3,20-dione 11,16,21-triacetate,
(8) 6β-azido-9α-fluoro-16α,17α-isopropylidenedioxy-4-pregnene-7α,11β,21-triol-3,20-dione 11,21-diacetate,
(9) 6β-azido-9α-fluoro-16α,17α-isobutylidenedioxy-4-pregnene-7α,11β,21-triol-3,20-dione 11,21-diacetate,
(10) 6β-azido-9α-fluoro-17α,21-isopropylidenedioxy-4-pregnene-7α,11β-diol-3,20-dione 11-acetate,
(11) 6β-azido-9α-fluoro-16α-methyl-17α,21-isopropylidenedioxy-4-pregnene-7α,11β-diol-3,20-dione 11-acetate,
(12) 6β-azido-9α-fluoro-16β-methyl-17α,21-isopropylidenedioxy-4-pregnene-7α,11β-diol-3,20-dione 11-acetate,
(13) 6β-azido-9α-fluoro-16-methylene-17α,21-isopropylidenedioxy-4-pregnene-7α,11β-diol-3,20-dione 11-acetate,
(14) 6β-azido-9α-bromo-16-fluoromethylene-4-pregnene-7α,11β,17α,21-tetrol-3,20-dione 11,21-diacetate,
(15) 6β-azido-9α-fluoro-16-methylene-4-pregnene-7α,11β,17α-triol-3,20-dione 11,17-diacetate,
(16) 6β-azido-9α-fluoro-16-chloromethylene-4-pregnene-7α,11β,17α-triol-3,20-dione 11,17-diacetate,
(17) 6β-azido-9α-fluoro-16α,17α-isopropylidenedioxy-4-pregnene-7α,11β-diol-3,20-dione 11-acetate,
(18) 6β-azido-9α-fluoro-16α-methyl-4-pregnene-7α,11β,17α-triol-3,20-dione 11,17-diacetate,
(19) 6β-azido-9α-fluoro-16β-methyl-4-pregnene-7α,11β,17α-triol-3,20-dione 11,17-diacetate,
(20) 6β-azido-9α,21-difluoro-4-pregnene-7α,11β,17α-triol-3,20-dione 11-acetate,
(21) 6β-azido-9α,21-difluoro-16α-methyl-4-pregnene-7α,11β,17α-triol-3,20-dione 11-acetate, and
(22) 6β-azido-9α,21-difluoro-16β-methyl-4-pregnene-7α,11β,17α-triol-3,20-dione 11-acetate.

(B) 6β-azido-7α,11β-diacetoxy-9α-halogeno-4-pregnene-3,20-diones

In a manner similar to that described in Example 1-B, treat each of the 6β-azido-7α-hydroxy-9α-halogeno-11β-acetoxy-4-pregnene-3,20-diones prepared in Example 6–A with acetic anhydride in pyridine in the presence of 4-dimethylaminopyridine under an argon atmosphere. Isolate and purify each of the resultant respective products in a manner similar to that described in Example 1–B to obtain, respectively, (1) 6β-azido-9α-fluoro-4-pregnene-7α,11β,17α,21-tetrol-3,20-dione 7,11,21-triacetate,
(2) 6β-azido-9α-chloro-4-pregnene-7α,11β,17α,21-tetrol-3,20-dione 7,11,21-triacetate,
(3) 6β-azido-9α-bromo-4-pregnene-7α,11β,17α,21-tetrol-3,20-dione 7,11,21-triacetate,
(4) 6β-azido-9α-fluoro-16-methylene-4-pregnene-7α,11β,17α,21-tetrol-3,20-dione 7,11,21-triacetate,
(5) 6β-azido-9α-chloro-16-methylene-4-pregnene-7α,11β,17α,21-tetrol-3,20-dione 7,11,21-triacetate,
(6) 6β-azido-9α-bromo-16-methylene-4-pregnene-7α,11β,17α,21-tetrol-3,20-dione 7,11,21-triacetate,
(7) 6β-azido-9α-fluoro-4-pregnene-7α,11β,16α,17α,21-pentol-3,20-dione 7,11,16,21-tetraacetate,
(8) 6β-azido-9α-fluoro-16α,17α-isopropylidenedioxy-4-pregnene-7α,11β,21-triol-3,20-dione 7,11,21-triacetate,
(9) 6β-azido-9α-fluoro-16α,17α-isobutylidenedioxy-4-pregnene-7α,11β,21-triol-3,20-dione 7,11,21-triacetate,
(10) 6β-azido-9α-fluoro-17α,21-isopropylidenedioxy-4-pregnene-7α,11β-diol-3,20-dione 7,11-diacetate,
(11) 6β-azido-9α-fluoro-16α-methyl-17α,21-isopropylidenedioxy-4-pregnene-7α,11β-diol-3,20-dione 7,11-diacetate,
(12) 6β-azido-9α-fluoro-16β-methyl-17α,21-isopropylidenedioxy-4-pregnene-7α,11β-diol-3,20-dione 7,11-diacetate,
(13) 6β-azido-9α-fluoro-16-methylene-17α,21-isopropylidenedioxy-4-pregnene-7α,11β-diol-3,20-dione 7,11-diacetate,

(14) 6β-azido-9α-bromo-16-fluoromethylene-4-pregnene-7α,11β,17α,21-tetrol-3,20-dione 7,11,21-triacetate,
(15) 6β-azido-9α-fluoro-16-methylene-4-pregnene-7α,11β,17α-triol-3,20-dione 7,11,17-triacetate,
(16) 6β-azido-9α-fluoro-16-chloromethylene-4-pregnene-7α,11β,17α-triol-3,20-dione 7,11,17-triacetate,
(17) 6β-azido-9α-fluoro-16α,17α-isopropylidenedioxy-4-pregnene-7α,11β-diol-3,20-dione 7,11-diacetate,
(18) 6β-azido-9α-fluoro-16α-methyl-4-pregnene-7α,11β,17α-triol-3,20-dione 7,11,17-triacetate,
(19) 6β-azido-9α-fluoro-16β-methyl-4-pregnene-7α,11β,17α-triol-3,20-dione 7,11,17-triacetate,
(20) 6β-azido-9α,21-difluoro-4-pregnene-7α,11β,17α-triol-3,20-dione 7,11-diacetate,
(21) 6β-azido-9α,21-difluoro-16α-methyl-4-pregnene-7α,11β,17α-triol-3,20-dione 7,11-diacetate, and
(22) 6β-azido-9α,21-difluoro-16β-methyl-4-pregnene-7α,11β,17α-triol-3,20-dione 7,11-diacetate.

(C) 6-azido-9α-halogeno-11β-acetoxy-4,6-pregnadiene-3,20-diones

In a manner similar to that described in Example 1–C, treat each of the 6β-azido-7α,11β-diacetoxy-9α-halogeno-4-pregnene-3,20-diones prepared as described in Example 6–B with tetramethylammonium fluoride pentahydrate in acetonitrile under an argon atmosphere in the absence of light. Isolate and purify each of the resultant respective products prepared in Example 1–C to obtain, respectively, (1) 6-azido-9α-fluoro-4,6-pregnadiene-11β,17α,21-triol-3,20-dione 11,21-diacetate,
(2) 6-azido-9α-chloro-4,6-pregnadiene-11β,17α,21-triol-3,20-dione 11,21-diacetate,
(3) 6-azido-9α-bromo-4,6-pregnadiene-11β,17α,21-triol-3,20-dione 11,21-diacetate,
(4) 6-azido-9α-fluoro-16-methylene-4,6-pregnadiene-11β,17α,21-triol-3,20-dione 11,21-diacetate,
(5) 6-azido-9α-chloro-16-methylene-4,6-pregnadiene-11β,17α,21-triol-3,20-dione 11,21-diacetate,
(6) 6-azido-9α-bromo-16-methylene-4,6-pregnadiene-11β,17α,21-triol-3,20-dione 11,21-diacetate,
(7) 6-azido-9α-fluoro-4,6-pregnadiene-11β,16α,17α,21-tetrol-3,20-dione 11,16,21-triacetate,
(8) 6-azido-9α-fluoro-16α,17α-isopropylidenedioxy-4,6-pregnadiene-11β,21-diol-3,20-dione 11,21-diacetate,
(9) 6-azido-9α-fluoro-16α,17α-isobutylidenedioxy-4,6-pregnadiene-11β,21-diol-3,20-dione 11,21-diacetate,
(10) 6-azido-9α-fluoro-17α,21-isopropylidenedioxy-4,6-pregnadiene-11β-ol-3,20-dione 11-acetate,
(11) 6-azido-9α-fluoro-16α-methyl-17α,21-isopropylidenedioxy-4,6-pregnadiene-11β-ol-3,20-dione 11-acetate,
(12) 6-azido-9α-fluoro-16β-methyl-17α,21-isopropylidenedioxy-4,6-pregnadiene-11β-ol-3,20-dione 11-acetate,
(13) 6-azido-9α-fluoro-16-methylene-17α,21-isopropylidenedioxy-4,6-pregnadiene-11β-ol-3,20-dione 11-acetate,
(14) 6-azido-9α-bromo-16-fluoromethylene-4,6-pregnadiene-11β,17α,21-triol-3,20-dione 11,21-diacetate,
(15) 6-azido-9α-fluoro-16-methylene-4,6-pregnadiene-11β,17-diol-3,20-dione 11,17-diacetate,
(16) 6-azido-9α-fluoro-16-chloromethylene-4,6-pregnadiene-11β,17α-diol-3,20-dione 11,17-diacetate,
(17) 6-azido-9α-fluoro-16α,17α-isopropylidenedioxy-4,6-pregnadiene-11β-ol-3,20-dione 11-acetate,
(18) 6-azido-9α-fluoro-16α-methyl-4,6-pregnadiene-11β,17α-diol-3,20-dione 11,17-diacetate,
(19) 6-azido-9α-fluoro-16β-methyl-4,6-pregnadiene-11β,17α-diol-3,20-dione 11,17-diacetate,
(20) 6-azido-9α-21-difluoro-4,6-pregnadiene-11β,17α-diol-3,20-dione 11-acetate,
(21) 6-azido-9α,21-difluoro-16α-methyl-4,6-pregnadiene-11β,17α-diol-3,20-dione 11-acetate, and
(22) 6-azido-9α,21-difluoro-16β-methyl-4,6-pregnadiene-11β,17α-diol-3,20-dione 11-acetate.

(D) 6-azido-9α-halogeno-4,6-pregnadiene 11β-ol-3,20-diones

In a manner similar to that described in Example 1–D, subject each of the 6-azido-9α-halogeno-11β-acetoxy-4,6-pregnadiene-3,20-diones to the action of the microorganism *Flavobaceterium dehydrogenans*. Isolate and purify the resultant respective products in a manner similar to that described in Example 1–D to obtain, respectively, (1) 6-azido-9α-fluoro-4,6-pregnadiene-11β,17α,21-triol-3,20-dione,
(2) 6-azido-9α-chloro-4,6-pregnadiene-11β,17α,21-triol-3,20-dione,
(3) 6-azido-9α-bromo-4,6-pregnadiene-11β,17α,21-triol-3,20-dione,
(4) 6-azido-9α-fluoro-16-methylene-4,6-pregnadiene-11β,17α,21-triol-3,20-dione,
(5) 6-azido-9α-chloro-16-methylene-4,6-pregnadiene-11β,17α,21-triol-3,20-dione,
(6) 6-azido-9α-bromo-16-methylene-4,6-pregnadiene-11β,17α,21-triol-3,20-dione,
(7) 6-azido-9α-fluoro-4,6-pregnadiene-11β,16α,17α,21-tetrol-3,20-dione,
(8) 6-azido-9α-fluoro-16α,17α-isopropylidenedioxy-4,6-pregnadiene-11β,21-diol-3,20-dione,
(9) 6-azido-9α-fluoro-16α,17α-isobutylidenedioxy-4,6-pregnadiene-11β,21-diol-3,20-dione,
(10) 6-azido-9α-fluoro-17α,21-isopropylidenedioxy-4,6-pregnadiene-11β-ol-3,20-dione,
(11) 6-azido-9α-fluoro-16α-methyl-17α,21-isopropylidenedioxy-4,6-pregnadiene-11β-ol-3,20-dione,
(12) 6-azido-9α-fluoro-16β-methyl-17α,21-isopropylidenedioxy-4,6-pregnadiene-11β-ol-3,20-dione,
(13) 6-azido-9α-fluoro-16-methylene-17α,21-isopropylidenedioxy-4,6-pregnadiene-11β-ol-3,20-dione,
(14) 6-azido-9α-bromo-16-fluoromethylene-4,6-pregnadiene-11β,17α,21-triol-3,20-dione,
(15) 6-azido-9α-fluoro-16-methylene-4,6-pregnadiene-11β,17-diol-3,20-dione,
(16) 6-azido-9α-fluoro-16-chroromethylene-4,6-pregnadiene-11β,17α-diol-3,20-dione,
(17) 6-azido-9α-fluoro-16α,17α-isopropylidenedioxy-4,6-pregnadiene-11β-ol-3,20-dione,
(18) 6-azida-9α-fluoro-16α-methyl-4,6-pregnadiene-11β,17α-diol-3,20-dione,
(19) 6-azido-9α-fluoro-16β-methyl-4,6-pregnadiene-11β,17α-diol-3,20-dione,
(20) 6-azido-9α,21-difluoro-4,6-pregnadiene-11β,17α-diol-3,20-dione,
(21) 6-azido-9α,21-difluoro-16α-methyl-4,6-pregnadiene-11β,17α-diol-3,20-dione, and
(22) 6-azido-9α,21-difluoro-16β-methyl-4,6-pregnadiene-11β,17α-diol-3,20-dione.

EXAMPLE 7

6-azido-11β-hydroxy-4,6-pregnadiene-3,20-diones (A) 6β-azido-7α-hydroxy-11β-acetoxy-4-pregnene-3,20-diones In a manner similar to that described in Example 4–A, treat each of the following 6α,7α-oxido-11β-acetoxy-4-pregnene-3,20-diones with sodium azide in aqueous methanol and dioxane in the absence of light:

(1) 6α,7α-oxido-16α-methyl-4-pregnene-11β,17α,21-triol-3,20-dione 11,21-diacetate,
(2) 6α,7α-oxido-16β-methyl-4-pregnene-11β,17α,21-triol-3,20-dione 11,21-diacetate,
(3) 6α,7α-oxido-16α-ethyl-4-pregnene-11β,17α,21-triol-3,20-dione 11,21-diacetate,
(4) 6α,7α-oxido-16-methylene-4-pregnene-11β,17α,21-triol-3,20-dione 11,21-diacetate, (5) 6α,7α-oxido-4-pregnene-11β,16α,21-tetrol-3,20-dione 11,16,21-triacetate,
(6) 6α,7α-oxido-16α,17α-isopropylidenedioxy-4-pregnene-11β,21-diol-3,20-dione 11,21-diacetate,
(7) 6α,7α-oxido-17α,21-isopropylidenedioxy-4-pregnene-11β-ol-3,20-dione 11-acetate,
(8) 6α,7α-oxido-16-chloromethylene-4-pregnene-11β,17α,21-triol-3,20-dione 11,21-diacetate,
(9) 6α,7α-oxido-16-methylene-4-pregnene-11β,17α-diol-3,20-dione 11,17-diacetate,
(10) 6α,7α-oxido-16-chloromethylene-4-pregnene-11β,17α-diol-3,20-dione 11,17-diacetate,
(11) 6α,7α-oxido-6α-methyl-4-pregnene-11β-17α-diol-3,20-dione 11,17-diacetate,
(12) 6α,7α-oxido-16β-methyl-4-pregnene-11β,17α-diol-3,20-dione 11,17-diacetate, and
(13) 6α,7α - oxido - 4 - pregnene-11β-ol-3,20-dione 11-acetate.

Isolate and purify each of the resultant respective products in a manner similar to that described in Example 4-A to obtain, respectively, (1) 6β-azido-16α-methyl-4-pregnene-7α,11β,17α,21-tetrol-3,20-dione 11,21-diacetate,
(2) 6β-azido-6β-methyl-4-pregnene-7α,11β-17α,21-tetrol-3,20-dione 11,21-diacetate,
(3) 6β-azido-16α-ethyl-4-pregnene-7α,11β,17α-tetrol-3,20-dione 11,21-diacetate,
(4) 6β-azido-16-methylene-4-pregnene-7α,11β,17α,21-tetrol-3,20-dione 11,21-diacetate,
(5) 6β-azido-4-pregnene-7α,11β,16α,17α,21-pentol-3,20-dione 11,16,21-triacetate,
(6) 6β-azido-6α,17α-isopropylidenedioxy-4-pregnene-7α,11β,21-triol-3,20-dione 11,21-diacetate,
(7) 6β-azido-17α,21-isopropylidenedioxy-4-pregnene-7α,11β-diol-3,20-dione 11-acetate,
(8) 6β-azido-16-chloromethylene-4-pregnene-7α,11β,17α,21-tetrol-3,20-dione 11,21-diacetate,
(9) 6β-azido-16-methylene-4-pregnene-7α,11β,17α-triol-3,20-dione 11,17-diacetate,
(10) 6β-azido-16-chloromethylene-4-pregnene-7α,11β,17α-triol-3,20-dione 11,17-diacetate,
(11) 6β-azido-16α-methyl-4-pregnene-7α,11β,17α-triol-3,20-dione 11,17-diacetate,
(12) 6β-azido-6β-methyl-4-pregnene-7α,11β,17α-triol-dione 11,17-diacetate, and
(13) 6β-azido-4-pregnene-7α,11β-diol-3,20-dione 11-acetate.

(B) 6β-azido-7α,11β-diacetoxy-4-pregnene-3,20-diones

In a manner similar to that described in Example 1-B, treat each of the 6β-azido-7α-hydroxy-11β-acetoxy-4-pregnene-3,20-diones prepared in Example 7-A with acetic anhydride in pyridine in the presence of 4-dimethylaminopyridine. Isolate and purify the respective resultant products in a manner similar to that described in Example 1-B to obtain, respectively, (1) 6β-azido-16α-methyl-4-pregnene-7α,11β,17α,21-tetrol-3,20-dione 7,11,21-triacetate,
(2) 6β-azido-16β-methyl-4-pregnene-7α,11β,17α,21-tetrol-3,20-dione 7,11,21-triacetate,
(3) 6β-azido-16α-ethyl-4-pregnene-7α,11β,17α,21-tetrol-3,20-dione 7,11,21-triacetate,
(4) 6β-azido-16-methylene-4-pregnene-7α,11β,17α,21-tetrol-3,20-dione 7,11,21-triacetate,
(5) 6β-azido-4-pregnene-7α,11β,16α,17α,21-pentol-3,20-dione 7,11,16,21-tetra-acetate,
(6) 6β-azido,16α,17α-isopropylidenedioxy-4-pregnene-7α,11β,21-triol-3,20-dione 7,11,21-triacetate,
(7) 6β-azido-17α,21-isopropylidenedioxy-4-pregnene-7α,11β-diol-3,20-dione 7,11-diacetate,
(8) 6β-azido-16-chloromethylene-4-pregnene-7α,11β,17α,21-tetrol-3,20-dione 7,11,21-triacetate,
(9) 6β-azido-16-methylene-4-pregnene-7α,11β,17α-triol-3,20-dione 7,11,17-triaceate,
(10) 6β-azido-16-chloromethylene-4-pregnene-7α,11β,17α-triol-3,20-dione, 7,11,17-triacetate,
(11) 6β-azido-16α-methyl-4-pregnene-7α,11β,17α-triol-3,20-dione 7,11,17-triacetate,
(12) 6β-azido-16β-methyl-4-pregnene-7α,11β,17α-triol-3,20-dione 7,11,17-triacetate, and
(13) 6β-azido-4-pregnene-7α,11β-diol-3,20-dione 7,11-diacetate.

(C) 6-azido-11β-acetoxy-4,6-pregnadiene-3,20-diones

In a manner similar to that described in Example 1-C, treat each of the 6β-azido-7α,11β-diacetoxy-4-pregnene-3,20-diones prepared as described in Example 7-B with tetramethylammonium fluoride pentahydrate in acetonitrile in the absence of light. Isolate and purify the resultant respective products in a manner similar to that described in Example 1-C to obtain, respectively, (1) 6-azido-16α-methyl-4,6-pregnadiene-11β,17α,21-triol-3,20-dione 11,21-diacetate,
(2) 6-azido-16β-methyl-4,6-pregnadiene-11β,17α,21-triol-3,20-dione 11,21-diacetate,
(3) 6-azido-16α-ethyl-4,6-pregnadiene-11β,17α,21-triol-3,20-dione 11,21-diacetate,
(4) 6-azido-16-methylene-4,6-pregnadiene-11β,17α,21-triol-3,20-dione 11,21-diacetate,
(5) 6-azido-4,6-pregnadiene-11β,16α,17α,21-tetrol-3,20-dione 11,16,21-triacetate,
(6) 6-azido-16α,17α-isopropylidenedioxy-4,6-pregnadiene-11β,21-diol-3,20-dione 11,21-diacetate,
(7) 6-azido-17α,21-isopropylidenedioxy-4,6-pregnadiene-11β-ol-3,20-dione 11-acetate,
(8) 6-azido-16-chloromethylene-4,6-pregnadiene-11β,17α,21-triol-3,20-dione 11,21-diacetate,
(9) 6-azido-16-methylene-4,6-pregnadiene-11β,17α-diol-3,20-dione 11,17-diacetate,
(10) 6-azido,16-chloromethylene-4,6-pregnadiene-11β,17α-diol-3,20-dione 11,17-diacetate,
(11) 6-azido-16α-methyl-4,6-pregnadiene-11β,17α-diol-3,20-dione 11,17-diacetate,
(12) 6-azido-16β-methyl-4,6-pregnadiene-11β,17α-diol-3,20-dione 11,17-diacetate, and
(13) 6-azido-4,6-pregnadiene-11β-ol-3,20-dione 11-acetate.

(D) 6-azido-4,6-pregnadiene-11β-ol-3,20-diones

In a manner similar to that described in Example 1-D, subject each of the 6-azido-11β-acetoxy-4,6-pregnadiene-3,20-diones to the action of the microorganisms *Flavobacterium dehydrogenans*. Isolate and purify the resultant respective products in a manner similar to that described in Example 1-D to obtain, respectively, (1) 6-azido-16α-methyl-4,6-pregnadiene-11β,17α,21-triol-3,20-dione,
(2) 6-azido-16β-methyl-4,6-pregnadiene-11β,17α,21-triol-3,20-dione,
(3) 6-azido-16α-ethyl-4,6-pregnadiene-11β,17α,21-triol-3,20-dione,
(4) 6-azido-16-methylene-4,6-pregnadiene-11β,17α,21-triol-3,20-dione,
(5) 6-azido-4,6-pregnadiene-11β,16α,17α,21-tetrol-3,20-dione,
(6) 6-azido-16α,17α-isopropylidenedioxy-4,6-pregnadiene-11β,21-diol-3,20-dione,
(7) 6-azido-17α,21-isopropylidenedioxy-4,6-pregnadiene-11β-ol-3,20-dione,
(8) 6-azido-16-chloromethylene-4,6-pregnadiene-11β,17,21-triol-3,20-dione,
(9) 6-azido-16-methylene-4,6-pregnadiene-11β,17α-diol-3,20-dione,

(10) 6-azido-16-chloromethylene-4,6-pregnadiene-11β, 17α-diol-3,20-dione,
(11) 6-azido-16α-methyl-4,6-pregnadiene-11β,17α-3,20-dione,
(12) 6-azido-16β-methyl-4,6-pregnadiene-11β,17α-diol-3,20-dione, and
(13) 6-azido-4,6-pregnadiene-11β-ol-3,20-dione.

EXAMPLE 8

Preparation of 21-unsubstituted-6-azido-4,6-pregnadienes from 21-acetoxy-6-azido-4,6-pregnadienes (A) 6-azido-11β-acetoxy-4,6-pregnadiene-21-ol-3,20-diones (1) To a solution of 0.486 g. of 6-azido-9α-fluoro-4,6-pregnadiene-11β,17α,21-triol-3,20-dione 11,21-diacetate in 14.4 ml. methanol, add dropwise 1.1 ml. of 1 N aqueous sodium hydroxide over a half-hour period while stirring the solution. Continue stirring at room temperature for another 1.5 hours, then neutralize by adding acetic acid dropwise. Pour into 100 ml. of water and concentrate the reaction mixture in vacuo to a volume of about 25 ml. Cool the aqueous reaction mixture, filter the resultant precipitate, then wash the filtered residue with water and air dry to obtain 6-azido-9α-fluoro-4,6-pregnadiene-11β, 17α-21-triol-3,20-dione 11-acetate. This product is used without further purification in the procedure described in Example 8–B hereinbelow.

(2) In a manner similar to that described in Example 8–A–1 hereinabove, treat each of the following 6-azido-11β,21-diacetoxy-4,6-pregnadienes in aqueous methanol with 1 N aqueous sodium hydroxide:

6-azido-9α-fluoro-16α-methyl-4,6-pregnadiene-11β,17α, 21-triol-3,20-dione 11,21-diacetate,
6-azido-9α-fluoro-16β-methyl-4,6-pregnadiene-11β,17α, 21-triol-3,20-dione 11,21-diacetate,
6-azido-9α-fluoro-16-methylene-4,6-pregnadiene-11β,17α, 21-triol-3,20-dione 11,21-diacetate,
6-azido-9α-fluoro-16α,17α-isopropylidenedioxy-4,6-pregnadiene-11β,21-diol-3,20-dione 11,21-diacetate, and
6-azido-4,6-pregnadiene-11β,17α,21-triol-3,20-dione 11-21-diacetate.

Isolate and purify the resultant respective products in a manner similar to that described in Example 8–A–1 to obtain, respectively, 6-azido-9α-fluoro-16α-methyl-4,6-pregnadiene-11β,17α, 21-triol-3,20-dione 11-acetate,
6-azido-9α-fluoro-16β-methyl-4,6-pregnadiene-11β,17α, 21-triol-3,20-dione 11-acetate,
6-azido-9α-fluoro-16-methylene-4,6-pregnadiene-11β,17α, 21-triol-3,20-dione 11-acetate,
6-azido-9α-fluoro-16α,17α-isopropylidenedioxy-4,6-pregnadiene-11β,21-diol-3,20-dione 11-acetate, and
6-azido-4,6-pregnadiene-11β,17α,21-triol-3,20-dione 11-acetate.

(B) 6-azido-11β-acetoxy-21-methanesulfonyloxy-4,6-pregnadiene-3,20-diones (1) To a solution of 5 g. of 6-azido-9α-fluoro-4,6-pregnadiene-11β,17α,21-triol-3,20-dione 11-acetate in 50 ml. of pyridine cooled to −20° C., add dropwise 5 ml. of methanesulfonyl chloride. Stir at −20° C. for 30 minutes, then pour into water and stir for two hours longer at room temperature. Filter and dry the resultant precipitate comprising 6-azido-9α-fluoro-4,6-pregnadiene-11β,17α,21-triol-3,20-dione 11-acetate 21-methanesulfonate.

(2) In a manner similar to that described in Example 8–B–1 hereinabove, treat each of the 6-azido-11β acetoxy-4,6-pregnadiene-21-ol-3,20-diones prepared as described in Example 8–A–2 hereinabove with methanesulfonyl chloride in pyridine. Isolate and purify the resultant respective products in a manner similar to that described hereinabove to obtain, respectively, 6-azido-9α-fluoro-16α-methyl-4,6-pregnadiene-11β,17α, 21-triol-3,20-dione 11-acetate 21-methanesulfonate,
6-azido-9α-fluoro-16β-methyl-4,6-pregnadiene-11β,17α, 21-triol-3,20-dione 11-acetate 21-methanesulfonate,
6-azido-9α-fluoro-16-methylene-4,6-pregnadiene-11β,17α, 21-triol-3,20-dione 11-acetate 21-methanesulfonate,
6-azido-9α-fluoro-16α,17α-isopropylidenedioxy-4,6-pregnadiene-11β,21-diol-3,20-dione 11 acetate 21-methanesulfonate, and
6-azido-4,6-pregnadiene-11β,17α,21-triol-3,20-dione 11-acetate 21-methanesulfonate.

(C) 6-azido-11β-acetoxy-21-iodo-4,6-pregnadiene-3,20-diones (1) To 3.5 g. of 6-azido-9α-fluoro-4,6-pregnadiene-11β, 17α,21-triol-3,20-dione 11-acetate 21-methanesulfonate in 52.5 ml. of acetone, add 3.5 g. of sodium iodide. Heat the reaction mixture at reflux temperature for 20 minutes, then pour into 500 ml. of water, filter and air dry to a residue comprising 6-azido-9α-fluoro-21-iodo-4,6-pregnadiene-11β,17α-diol-3,20-dione 11-acetate.

(2) In a manner similar to that described in Example 8–C–1, treat each of the 6-azido-11β-acetoxy-21-methanesulfonyloxy-4,6-pregnadienes prepared as described in Example 8–B–2 with sodium iodide in acetone. Isolate and purify the resultant respective products in a manner similar to that described in Example 8–B–2 to obtain, respectively, 6-azido-9α-fluoro-21-iodo-16α-methyl-4,6-pregnadiene-11β,17α-diol-3,20-dione 11-acetate,
6-azido-9α-fluoro-21-iodo-16β-methyl-4,6-pregnadiene-11β,17α-diol-3,20-dione 11-acetate,
6-azido-9α-fluoro-21-iodo-16-methylene-4,6-pregnadiene-11β,17α-diol-3,20-dione 11-acetate,
6-azido-9α-fluoro-21-iodo-16α,17α-isopropylidenedioxy-4,6-pregnadiene-11β-ol-3,20-dione 11-acetate, and
6-azido-21-iodo-4,6-pregnadiene-11β,17α-diol-3,20-dione 11-acetate.

(D) 6-azido-11β-acetoxy-21-unsubstituted-4,6-pregnadiene-3,20-diones (1) To a refluxing solution of 1 g. of 6-azido-9α-fluoro-21-iodo-4,6-pregnadiene-11β,17α-diol-3,20-dione 11-acetate in 20 ml. of methanol, add a solution of 3 g. of sodium bisulfite in 10 ml. of water. Stir the reaction mixture at reflux temperature for 30 minutes, then concentrate in vacuo to a crystalline slurry. Dilute the slurry with 20 ml. of water and collect the crystalline precipitate by filtration. Wash the precipitate with hot water, then dry in vacuo to give 6-azido-9αfluoro-4,6-pregnadiene-11β, 17α-diol-3,20-dione 11-acetate. Purify by crystallization from acetone-hexane.

(2) In a manner similar to that described in Example 8–D–1 hereinabove, treat each of the 6-azido-11β-acetoxy-21-iodo-4,6-pregnadienes prepared as described in Example 8–C–2 in methanol with aqueous sodium bisulfite. Isolate and purify the resultant products in a manner similar to that described to obtain, respectively, 6-azido-9α-fluoro 16α-methyl-4,6-pregnadiene-11β,17α-diol-3,20-dione 11-acetate,
6-azido-9α-fluoro-16β-methyl-4,6-pregnadiene-11β,17α-diol-3,20-dione 11-acetate,
6-azido-9α-fluoro-16-methylene-4,6-pregnadiene-11β,17α-diol-3,20-dione 11-acetate,
6-azido-9α-fluoro-16α,17α-isopropylidenedioxy-4,6-pregnadiene-11β-ol-3,20-dione 11-acetate, and
6-azido-4,6-pregnadiene-11β,17α-diol-3,20-dione 11-acetate.

(E) 6-azido-11β-hydroxy-21-unsubstituted-4,6-pregnadiene-3,20-diones (1) In a manner similar to that described in Example 1–D, subject 6-azido-9α-fluoro-4,6-pregnadiene-11β,17α-diol-3,20-dione 11-acetate to the action of *Flavobacterium dehydrogenans* (ATCC 13930). Isolate and purify the resultant respective products in a manner similar to that described in Example 1–D to obtain 6-azido-9α-fluoro-4,6-pregnadiene-11β,17α-diol-3,20-dione.

(2) In a manner similar to that described in Example 8–E–1 hereinabove, subject each of the 6-azido-11β-acetoxy-21-unsubstituted-4,6-pregnadienes prepared in Example 8–D–2 to the action of *Flavobacterium dehydrogenans*. Isolate and purify the resultant respective products in a manner similar to that described hereinabove to obtain, respectively, 6-azido-9α-fluoro-16α-methyl-4,6-pregnadiene-11β,17α-diol-3,20-dione,
6-azido-9α-fluoro-16β-methyl-4,6-pregnadiene-11β,17α-diol-3,20-dione,
6-azido-9α-fluoro-16-methylene-4,6-pregnadiene-11β,17α-diol-3,20-dione,
6-azido-9α-fluoro-16α,17α-isopropylidenedioxy-4,6-pregnadiene-11β-ol-3,20-dione, and
6-azido-4,6-pregnadiene-11β,17α-diol-3,20-dione.

EXAMPLE 9

21-halogeno-6-azido-4,6-pregnadiene-3,20-diones (A) 6-azido-9α-fluoro-21-halogeno-4,6-pregnadiene-11β,17α-diol-3,20-dione 11-acetate (1) To 0.5 g. of 6-azido-9α-fluoro-21-iodo-4,6-pregnadiene-11β,17α-diol-3,20-dione 11-acetate (compound of Example 8–C–1) in 100 ml. of acetonitrile containing 1 ml. of water, add 1.76 g. of silver chloride in a 50% aqueous solution. Warm the mixture at 30–40° C. for four hours, then filter and pour the filtrate into water. Filter the resultant precipitate comprising 6-azido-9α-fluoro-21-chloro - 4,6 - pregnadiene - 11β,17α-diol-3,20-dione 11-acetate.

(2) The above procedure by substituting for silver chloride an equivalent quantity of silver fluoride or silver bromide, there is obtained the corresponding 21-fluoride or 21-bromide derivative, i.e. 6-azido-9α,21-difluoro-4,6-pregnadiene-11β,17α-diol-3,20-dione 11-acetate and 6-azido-9α-fluoro - 21 - bromo - 4,6-pregnadiene-11β,17α-diol-3,20-dione 11-acetate, respectively.

(3) In a manner similar to that described in Example 9–A, treat each of the 6-azido-11β-acetoxy-21-iodo-4,6-pregnadiene-3,20-diones prepared as described in Example 8–C–2 with silver chloride in moist acetonitrile. Isolate each of the respective products in a manner similar to that described in Example 9–A–1 to obtain, respectively, 6-azido-9α-fluoro-21-chloro-16α-methyl-4,6-pregnadiene-11β,17α-diol-3,20-dione 11-acetate,
6-azido-9α-fluoro-21-chloro-16β-methyl-4,6-pregnadiene-11β,17α-diol-3,20-dione 11-acetate,
6-azido-9α-fluoro-21-chloro-16-methylene-4,6-pregnadiene-11β,17α-diol-3,20-dione 11-acetate,
6-azido-9α-fluoro-21-chloro-16α,17α-isopropylidenedioxy-4,6-pregnadiene-11β-ol-3,20-dione 11-acetate, and
6-azido-21-chloro-4,6-pregnadiene-11β,17α-diol-3,20-dione 11-acetate.

(4) In the procedure of Example 9–A–3 by using silver fluoride in place of silver chloride there is obtained the corresponding 21-fluoro derivative of each of the products produced in Example 9–A–3.

(B) 6-azido-9α-fluoro-21-halogeno-4,6-pregnadiene-11β,17α-diol-3,20-dione (1) In a manner similar to that described in Example 1–D, subject each of the 6-azido-11β-acetoxy-21-chloro-4,6-pregnadiene-3,20-diones prepared as described in Example 9–A–1 and 9–A–3 to the action of the microorganism *Flavobacterium dhydrogenans* (ATCC 13930). Isolate and purify the resultant respective products in a manner similar to that described in Example 1–D to obtain, respectively, 6-azido-9α-fluoro-21-chloro-4,6-pregnadiene-11β,17α-diol-3,20-dione,
6-azido-9α-fluoro-21-chloro-16α-methyl-4,6-pregnadiene-11β,17α-diol-3,20-dione,
6-azido-9α-fluoro-21-chloro-16β-methyl-4,6-pregnadiene-11β,17α-diol-3,20-dione,
6-azido-9α-fluoro-21-chloro-16-methylene-4,6-pregnadiene-11β,17α-diol-3,20-dione,
6-azido-9α-fluoro-21-chloro-16α,17α-isopropylidenedioxy-4,6-pregnadiene-11β-ol-3,20-dione, and
6-azido-21-chloro-4,6-pregnadiene-11β,17α-diol-3-20-dione.

(2) Similarly, in the manner described in Example 1–D treat each of the 6-azido-11β-acetoxy-21-fluoro-4,6-pregnadiene-3,20-diones and 6-azido-11β-acetoxy-21-bromo-4,6-pregnadiene-3,20-diones prepared as described in Examples 9–A–2 and 9–A–4, to the action of the microorganism *Flavobacterium dehydrogenans* (ATCC 13930) and there will be obtained the corresponding 11β-hydroxy derivative, e.g. 6 - azido-9α,21-difluoro-4,6-pregnadiene-11β,17α-diol-3,20-dione 11-acetate and 6-azido-9α-fluoro-21-bromo 4,6-pregnadiene-11β,17α-diol-3,20-dione 11-acetate.

EXAMPLE 10

6-azido-9α-fluoro-16α-methyl-4,6-pregnadiene-11β,17α,21-triol-3,20-dione prepared via the 11-formate ester (A) 6β-azido-9α-fluoro-16α-methyl-4-pregnene-7α,11β,17α,21-tetrol-3,20-dione 11,17-diformate 21-acetate (1) In a manner similar to that described in Example 1–A, treat 6α,7α-oxido-9α-fluoro-16α-methyl-4-pregnene-11β,17α,21 - triol - 3,20-dione 11,17-diformate 21-acetate with sodium azide in aqueous methanol. Isolate and purify the resultant precipitate in a manner similar to that described to obtain 6β-azido-9α-fluoro-16α-methyl-4-pregnene - 7α,11β,17α,21 - tetrol-3,20-dione 11,17-diformate 21-acetate.

(2) Similarly, treat each of 6α,7α-oxido 9α-fluoro-16β - methyl - 4 - pregnene-11β,17α,21-triol-3,20-dione 11,17-diformate 21-acetate and 6α,7α-oxido-4-pregnene-11β,17α,21 - triol - 3,20-dione 11,17-diformate 21-acetate with sodium azide in aqueous methanol. Isolate and purify the resultant product in a manner similar to that described hereinabove to obtain, respectively, 6β-azido-9α-fluoro-16β - methyl - 4 - pregnene - 7α,11β,17α,21-tetrol-3,20-dione 11,17-diformate 21-acetate, and 6β-azido-4-pregnene - 7α,11β,17α,21 - tetrol-3,20-dione 11,17-diformate 21-acetate.

(B) 6β-azido-9α-fluoro-16α-methyl-4-pregnene-7α,11β,17α,21-tetrol-3,20-dione 7,21-diacetate 11,17-diformate (1) In a manner similar to that described in Example 1–B, treat 6β-azido-9α-fluoro-16α-methyl-4-pregnene-17α,11β,17α,21 - tetrol-3,20 - dione 11,17-diformate 21-acetate with acetic anhydride in pyridine in the presence of 4-dimethylaminopyridine. Isolate and purify the resultant product in a manner similar to that described to obtain 6β - azido - 9α - fluoro-16α-methyl-4-pregnene-7α,11β,17α,21-tetrol-3,20-dione 7,21-diacetate 11,17-diformate.

(2) Similarly, treat each of the 6β-azido-7α-hydroxy-4-pregnene-3,20-diones of Example 10–A–2 with acetic anhydride in pyridine in the presence of 4-dimethylaminopyridine to yield the corresponding 7-acetoxy derivative, i.e. 6β-azido-9α-fluoro-16β-methyl-4-pregnene-7α,11β,17α, 21 - tetrol - 3,20 - dione 7,21-diacetate 11,17-diformate and 6β - azido - 4 - pregnene-7α,11β,17α,21-tetrol-3,20-dione 7,21-diacetate 11,17-diformate.

(C) 6-azido-9α-fluoro-16α-methyl-4,6-pregnadiene-11β-17α,21-triol-3,20-dione 11,17-diformate 21-acetate In a manner similar to that described in Example 1–C, treat each of 6β-azido-9α-fluoro-16α-methyl-4-pregnene-7α,11β,17α,21 - tetrol - 3,20 - dione 7,21-diacetate 11,17-diformate and 6β-azido-9α-fluoro-16β-methyl-4-pregnene-7α,11β,17α,21 - tetrol - 3,20-dione 7,21-diacetate 11,17-diformate with tetramethyl-ammonium fluoride pentahydrate in acetonitrile. Isolate and purify the resultant products in a manner similar to that described to obtain 6-azido - 9α - fluoro - 16α-methyl-4,6-pregnadiene-11β,17α, 21 - triol - 3,20-dione 11,17-diformate 21-acetate and 6-azido - 9α - fluoro - 16β-methyl-4,6-pregnadiene-11β,17α, 21-triol-3,20-dione 11,17-diformate 21-acetate.

(D) To a solution of 1.6 g. of 6-azido-9α-fluoro-16α-methyl - 4,6 - pregnadiene - 11β,17α,21-triol-3,20-dione 11,17-diformate 21-acetate in 60 ml. of methanol, add 10 ml. of 1-N-sodium hydroxide. Stir at room temperature overnight. Add acetic acid dropwise until the solution reaches neutrality, then remove the solvent in vacuo. Extract the resultant residue with methylene chloride and wash the combined organic extracts with water. Dry over magnesium sulphate and evaporate the methylene chloride solution to a residue comprising 6-azido-9α-fluoro-16α-methyl - 4,6 - pregnadiene - 11β,17α,21-triol-3,20-dione. Purify by chromatography.

(2) In similar manner, treat each of 6-azido-9α-fluoro-16β - methyl - 4,6-pregnadiene-11β,17α,21-triol-3,20-dione 11,17-diformate 21-acetate and 6-azido-4,6-pregnadiene-11β,17α,21 - triol - 3,20-dione 11,17-diformate 21-acetate with sodium hydroxide in aqueous methanol to obtain, respectively, 6-azido-9α-fluoro-16β-methyl-4,6-pregnadiene-11β,17α,21 - triol-3,20-dione and 6-azido-4,6-pregnadiene-11β,17α,21-triol-3,20-dione.

EXAMPLE 11

Conversion of 6α,7α-oxido-9α-fluoro-16α-methyl-4-pregnene - 11β,17α,21 - triol-3,20-dione 11-trifluoroacetate 21 - acetate to 6-azido-9α-fluoro-16α-methyl-4,6-pregnadiene-11β,17α,21-triol 3,20-dione 21-acetate via the 11-trifluoroacetate ester (A) 6β-azido-9α-fluoro-16α-methyl-4-pregnene-7α,11β, 17α,21-tetrol-3,20-dione 11-trifluoroacetate 21-acetate In a manner similar to that described in Example 2, treat 6α,7α - oxido - 9α-fluoro-16α-methyl-4-pregnene-11β, 17α,21-triol-3,20-dione 11-trifluoroacetate 21-acetate with sodium azide in aqueous methanol in the presence of acetic acid. Isolate and purify the resultant product in a manner similar to that described to obtain 6β-azido-9α-fluoro - 16α - methyl - 4-pregnene-7α,11β,17α,21-tetrol-3,20-dione 11-trifluoroacetate 21-acetate.

(B) 6β-azido-9α-fluoro-16α-methyl-4-pregnene-7α,11β, 17α,21-tetrol-3,20-dione 7,21-diacetate In a manner similar to that described in Preparation 1–D–1, treat 6β-azido-9α-fluoro-16α-methyl-4-pregnene-7α,11β,17α,21 - tetrol - 3,20-dione 11-trifluoroacetate 21-acetate with one molar equivalent of acetic anhydride in pyridine. Isolate and purify the resultant product in a manner similar to that described to obtain 6β-azido-9α-fluoro - 16α - methyl - 4 - pregnene - 7α,11β,17α,21-tetrol-3,20-dione 7,21-diacetate.

(C) 6-azido-9α-fluoro-16α-methyl-4,6-pregnadiene-11β,17α,21-triol-3,20-dione 21-acetate In a manner similar to that described in Example 1–C, treat 6β-azido - 9α - fluoro-16α-methyl-4-pregnene-7α,11β, 17α,21-tetrol-3,20-dione 7,21-diacetate with tetramethyl-ammonium fluoride pentahydrate in acetonitrile. Isolate and purify the resultant product in a manner similar to that described to obtain 6-azido-9α-fluoro-16α-methyl-4,6-pregnadiene-11β,17α,21-triol-3,20-dione 21-acetate.

Alternatively, the compound of this example may be prepared according to procedures described in following Examples 11D through 11G.

(D) 6β-azido-9α-fluoro-16α-methyl-4-pregnene-7α,11β, 17α,21-tetrol-3,20-dione 7,11,21-triacetate In a manner similar to that described in Example 1–B, treat 6β-azido - 9α - fluoro-16α-methyl-4-pregnene-7α,11β, 17α,21 - tetrol-3,20-dione 11-trifluoroacetate 21-acetate with acetic anhydride in pyridine in the presence of 4-dimethylaminopyridine. Isolate and purify the resultant product in a manner similar to that described to obtain 6β - azido - 9α - fluoro - 4 - pregnene-7α,11β,17α,21-tetrol-3,20-dione 7,11,21-triacetate.

(E) 6-azido-9α-fluoro-16α-methyl-4,6-pregnadiene-7α, 11β,17α,21-tetrol-3,20-dione 11,21-diacetate In a manner similar to that described in Example 1–C, treat 6β-azido - 9α - fluoro-16α-methyl-4-pregnene-7α,11β, 17α,21-tetrol-3,20-dione 7,11,21-triacetate with tetramethylammonium fluoride in acetonitrile. Isolate and purify the resultant product in a manner similar to that described to obtain 6-azido-9α-fluoro-16α-methyl-4,6-pregnadiene-11β,17α,21-triol-3,20-dione 11,21-diacetate.

(F) 6-azido-9α-fluoro-16α-methyl-4,6-pregnadiene-11β,17α,21-triol-3,20-dione

In a manner similar to that described in Example 1–D, subject 6 - azido - 9α - fluoro-16α-methyl-4,6-pregnadiene-11β,17α,21-triol-3,20-dione 11,21-diacetate to the action of the microorganism *Flavobacterium dehydrogenans* (ATCC 13930). Isolate and purify the resultant product in a manner similar to that described to obtain 6-azido-9α-fluoro - 16α - methyl-4,6-pregnadiene-11β,17α,21-triol-3,20-dione.

(G) 6-azido-9α-fluoro-16α-methyl-4,6-pregnadiene-11β,17α,21-triol-3,20-dione 21-acetate In a manner similar to that described in Preparation 1–D–1, treat 6-azido-9α-fluoro-16α-methyl-4,6-pregnadiene-11β,17α,21-triol-3,20-dione with acetic anhydride in pyridine. Isolate and purify the resultant product in a manner similar to that described to obtain 6-azido-9α-fluoro - 16α - methyl - 4,6 - pregnadiene-11β,17α,21-triol-3,20-dione 21-acetate.

EXAMPLE 12

6-azido-9α-halogeno-1,4,6-pregnatriene-11β,17α,21-triol-3,20-dione (A) 6-azido-9α-halogeno-1,4,6-pregnatriene-11β,17α, 21-triol-3,20-dione 11,21-diacetates Prepare a hydrochloric acid-dioxane solution by adding 0.5 ml. of concentrated hydrochloric acid and 5 ml. of water to 49.5 ml. of dioxane. To 10 ml. of this hydrochloric acid-dioxane solution, add 125 mg. of 6-azido-9α-fluoro - 16α - methyl - 4,6 - pregnadiene-11β,17α,21-triol-3,20-dione 11,21-diacetate and 150 mg. of 2,3-dichloro-5,6-dicyanobenzoquinone (DDQ). Under an atmosphere of nitrogen warm the solution to 60° C. with stirring for 30 minutes. Pour the reaction mixture into 100 ml. of water and extract with ethyl aceate. Wash the combined ethyl acetate extracts with concentrated aqueous sodium sulfite solution and then with water. Dry the ethyl acetate solution over magnesium sulphate and filter. Pass the solution through a Florisil column, evaporate the eluate in vacuo to a residue comprising 6-azido-9α-fluoro-16α-methyl - 1,4,6 - pregnatriene - 11β,17α,21 - triol-3,20-dione 11,21-diacetate.

In similar manner, treat all the other 6-azido-9α-halogeno-11β-acetoxy-16-methyl-4,6-pregnadienes prepared in Example 3-C with DDQ and concentrated hydrochloric acid and aqueous dioxane to obtain, respectively.

6-azido-9α-fluoro-16β-methyl-1,4,6-pregnatriene-11β, 17α,21-triol-3,20-dione, 11,21-diacetate.
6-azido-9α-chloro-16α-methyl-1,4,6-pregnatriene-11β, 17α,21-triol-3,20-dione 11,21-diacetate,
6-azido-9α-chloro-16β-methyl-1,4,6-pregnatriene-11β, 17α,21-triol-3,20-dione 11,21-diacetate,
6-azido-9α-bromo-16α-methyl-1,4,6-pregnatriene-11β, 17α,21-triol-3,20-dione 11,21-diacetate, and
6-azido-9α-bromo-16β-methyl-1,4,6-pregnatriene-11β, 17α,21-triol-3,20-dione 11,21-diacetate.

(B) 6-azido-9α-halogeno-1,4,6-pregnatriene-11β,17α, 21-triol-3,20-diones

In a manner similar to that described in Example 1–D, subject each of the 6-azido-9α-halogeno-1,4,6-pregnatriene - 11β,17α,21 - triol-3,20-dione 11,21-diacetates prepared in preceding Example 12–A to the action of the microorganism *Flavobacterium dehydrogenans* (ATCC 13930) to obtain, respectively, 6-azido-9α-fluoro-16α-methyl-1,4,6-pregnatriene-11β,17α,21-triol-3,20-dione,
6-azido-9α-fluoro-16β-methyl-1,4,6-pregnatriene-11β,17α,21-triol-3,20-dione,
6-azido-9α-chloro-16α-methyl-1,4,6-pregnatriene-11β,17α,21-triol-3,20-dione,
6-azido-9α-chloro-16β-methyl-1,4,6-pregnatriene-11β,17α,21-triol-3,20-dione,
6-azido-9α-bromo-16α-methyl-1,4,6-pregnatriene-11β,17α,21-triol-3,20-dione, and
6-azido-9α-bromo-16β-methyl-1,4,6-pregnatriene-11β,17α,21-triol-3,20-dione.

We claim:

1. A compound selected from the group consisting of a 6β - azido - 7α - oxygenated - 4 - pregnene of following structural Formula I and the 1-dehydro analogs thereof:

wherein Q is a member selected from the group consisting of hydroxy, OR wherein R is an acyl radical of a hydrocarboncarboxylic acid having up to 12 carbon atoms, and hydrogen provided W is a member selected from group consisting of hydrogen and (H, lower alkyl);

V is a member selected from the group consisting of hydrogen and an acyl radical of an acid selected from the group consisting of a hydrocarboncarboxylic acid having up to 8 carbon atoms and a hydrocarbonsulfonic acid having up to 7 carbon atoms;

W is a member selected from the group consisting of hydrogen, (H,lower alkyl), (H,α-hydroxy) and (H,α-OR') wherein R' is an acyl radical of a hydrocarboncarboxylic acid having up to 12 carbon atoms, =CHT wherein T is a member selected from the group consisting of hydrogen, lower alkyl, fluorine and chlorine, and W taken together with Q, 16α,17α-lower alkylidenedioxy;

X is a member selected from the group consisting of hydrogen and a halogen having an atomic weight less than 100;

Y is a member selected from the group consisting of formyloxy, acetoxy and halogenoacetoxy; and Z is a member selected from the group consisting of halogen, hydrogen, hydroxy, OR'' wherein R'' is an acyl radical of an acid selected from the group consisting of a hydrocarboncarboxylic acid having up to 12 carbon atoms, and when taken together with Q, 17α,21-lower alkylidenedioxy.

2. A 6β - azido - 7α - oxygenated - 4 - pregnene according to claim 1 wherein Y is a member selected from the group consisting of formyloxy, acetoxy and trifluoroacetoxy.

3. A 6β - azido - 7α - oxygenated - 4 - pregnene according to claim 1, Formula I, wherein X is a halogen having an atomic weight less than 100, and Y is a member selected from the group consisting of formyloxy, acetoxy and trifluoroacetoxy.

4. A 6β - azido - 7α - oxygenated - 4 - pregnene according to claim 1, Formula I, wherein W is methylene and Y is a member selected from the group consisting of formyloxy, acetoxy and trifluoroacetoxy.

5. A 6β - azido - 7α - oxygenated - 4 - pregnene according to claim 1, Formula I, wherein Q is hydroxy, V is hydrogen, W is a member selected from the group consisting of hydrogen and (H,lower alkyl), X is fluorine, Y is acetoxy and Z is OR'', R'' being lower alkanoyl, said compound having the following structural formula:

wherein R'' and W are as hereinabove defined.

6. A compound according to claim 5 wherein W is (H,α-methyl) and R'' is acetyl, said compound being 6β - azido - 9α - fluoro - 16α - methyl - 4 - pregnene-7α,11β,17α,21-tetrol-3,20-dione 11,21-diacetate.

7. A compound according to claim 5 wherein W is (H,β-methyl) and R'' is acetyl, said compound being 6β - azido - 9α - fluoro - 16β - methyl - 4 - pregnene-7α,11β,17α,21-tetrol-3,20-dione 11,21-diacetate.

8. A 6β - azido - 7α - oxygenated - 4 - pregene according to claim 1, Formula I, wherein Q is hydroxy, V is lower alkanoyl, W is a member selected from the group consisting of hydrogen and (H,lower alkyl), X is fluorine and Z is OR'', R'' being lower alkanoyl, said compound having the following structural formula:

wherein R'', V and W are as hereinabove defined.

9. A compound according to claim 8 wherein V and R'' are acetyl and W is (H,α-methyl), said compound being 6β - azido - 9α - fluoro - 16α - methyl - 4 - pregnene-7α,11β,17α,21-tetrol-3,20-dione 7,11,21-triacetate.

10. A compound according to claim 8 wherein V and R'' are acetyl and W is (H,β-methyl), said compound being 6β - azido - 9α - fluoro - 16β - methyl - 4 - pregnene-7α,11β,17α,21-tetrol-2,20-dione 7,11,21-triacetate.

11. A compound according to claim 1, Formula I, wherein Q is hydroxy, V is hydroxy or the acetate ester thereof, W is methylene, X is fluorine, Y and Z are acetoxy, said compounds being 6β - azido - 9α - fluoro - 16-methylene - 4 - pregnene - 7α,11β,17α,21 - tetrol - 3,20-dione 11,21-diacetate and the 7α-acetate ester thereof.

12. A compound according to claim 1, Formula I, wherein X is fluorine, Y and Z are acetoxy, and V is hydroxy or an acetate ester thereof, Q is hydroxy and W is acetoxy, or Q and W together are isopropylidenedioxy, said compounds being 6β-azido-9α-fluoro-4-pregnene-7α,11β,16α,17α,21-pentol-3,20-dione 11,16,21-triacetate, and 6β-azido-9α-fluoro-16α,17α-isopropylidenedioxy - 4 - pregnene-7α,11β,21-triol-3,20-dione 11,21-diacetate and the 7-acetate esters thereof.

13. A compound selected from the group consisting of a 6-azido-4,6-pregnadiene-3,20-dione of following structural Formula I and the 1-dehydro analogs thereof:

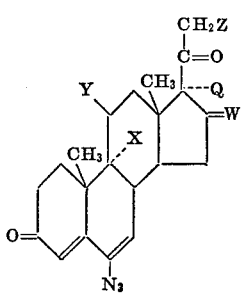

wherein Q is a member selected from the group consisting of hydroxy, OR wherein R is an acyl radical of a hydrocarboncarboxylic acid having up to 12 carbon atoms, and hydrogen provided W is a member selected from the group consisting of hydrogen and (H,lower alkyl);

W is a member selected from the group consisting of hydrogen, (H,lower alkyl), (H,α-hydroxy) and (H,α-OR') wherein R' is an acyl radical of a hydrocarboncarboxylic acid having up to 12 carbon atoms, =CHT wherein T is a member selected from the group consisting of hydrogen, lower alkyl, fluorine and chlorine, and W taken together with Q, 16α,17α-lower alkylidenedioxy;

X is a member selected from the group consisting of hydrogen and a halogen having an atomic weight less than 100;

Y is a member selected from the group consisting of formyloxy, acetoxy and halogenoacetoxy; and Z is a member selected from the group consisting of hydrogen, halogen, hydroxy, OR" wherein R" is an acyl radical of an acid selected from the group consisting of a hydrocarbonsulfonic acid having up to 7 carbon atoms and a hydrocarboncarboxylic acid having up to 12 carbon atoms, and when taken together with Q, 17α,21-lower alkylidenedioxy.

14. A 6-azido-4,6-pregnadiene-3,20-dione of claim 13 wherein Y is a member selected from the group consisting of formyloxy, acetoxy and trifluoroacetoxy.

15. A 6-azido-4,6-pregnadiene-3,20-dione according to claim 13, Formula I, wherein X is a halogen having an atomic weight less than 100, and Y is a member selected from the group consisting of formyloxy, acetoxy and trifluoroacetoxy.

16. A 6-azido-4,6-pregnadiene-3,20-dione according to claim 13, Formula I, wherein W is methylene and Y is a member selected from the group consisting of formyloxy, acetoxy and trifluoroacetoxy.

17. A 6-azido-4,6-pregnadiene-3,20-dione according to claim 13, Formula I, wherein Q is hydroxy, W is a member selected from the group consisting of hydrogen and (H,lower alkyl), X is fluorine, Y is acetoxy, and Z is OR", R" being lower alkanoyl, said compound having the following structural formula:

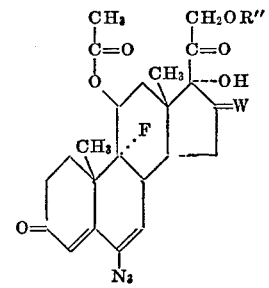

wherein R" and W are as hereinabove defined.

18. A compound according to claim 17 wherein R" is acetyl and W is (H,α-methyl), said compounds being 6-azido-9α-fluoro-16α-methyl-4,6-pregnadiene - 11β,17α,21-triol-3,20-dione 11,21-diacetate.

19. A 6-azido-4,6-pregnadiene according to claim 17 wherein Q is hydroxy, W is (H,β-methyl), and R" is acetyl, said compound being 6-azido-9α-fluoro-16β-methyl-4,6-pregnadiene-11β,17α,21-triol-3,20-dione 11,21 - diacetate.

20. A 6-azido-4,6-pregnadiene-3,20-dione according to claim 13, Formula I, wherein Q is hydroxy, W and X are hydrogen, Y and Z are acetoxy, said compound being 6-azido-4,6-pregnadiene-11β,17α,21-triol - 3,20 - dione 11,21-diacetate.

21. A 6-azido-4,6-pregnadiene-3,20-dione according to claim 13, Formula I, wherein Q is hydroxy, W is methylene, X is fluorine, Y and Z are each acetoxy, said compound being 6-azido-9α-fluoro-16-methylene - 4,6 - pregnadiene-11β,17α,21-triol-3,20-dione 11,21-diacetate.

22. A 6-azido-4,6-pregnadiene-3,20-dione according to claim 13, Formula I, wherein X is fluorine, Y and Z are each acetoxy, Q is hydroxy, and W is acetoxy or, Q and W taken together are isopropylidenedioxy, said compounds being 6-azido-9α-fluoro-4,6-pregnadiene - 11β,16α,17α,21-tetrol-3,20-dione 11,16,21-triacetate and 6-azido-9α - fluoro-16α,17α-isopropylidenedioxy-4,6-pregnadiene-11β,21-diol-3,20-dione 11,21-diacetate.

23. A process for preparing 6-azido-4,6-pregnadiene-3,20-diones of the following Formula I:

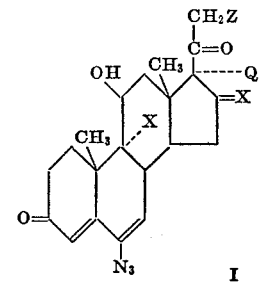

wherein Q is a member selected from the group consisting of hydroxy, OR wherein R is an acyl radical of a hydrocarboncarboxylic acid having up to 12 carbon atoms, and hydrogen provided W is a member selected from the group consisting of hydrogen and (H,lower alkyl);

W is a member selected from the group consisting of hydrogen, (H,lower alkyl), (H,α-hydroxy), (H,α-OR') wherein R' is an acyl radical of a hydrocarboncarboxylic acid having up to 12 carbon atoms, =CHT wherein T is a member selected from the group consisting of hydrogen, lower alkyl, fluorine and chlorine, and W taken together with Q, 16α,17α-lower alkylidenedioxy;

X is a member selected from the group consisting of hydrogen and halogen having an atomic weight less than 100; and Z is a member selected from the group consisting of hydrogen, halogen, hydroxy and OR″ wherein R″ is a member selected from the group consisting of hydrogen and an acyl radical of an acid selected from the group consisting of a hydrocarboncarboxylic acid having up to 12 carbon atoms, and when taken together with Q, 17α,21-lower alkylidenedioxy;

which comprises treating a 6α,7α-oxido-4-pregnene-3,20-dione of the following Formula A:

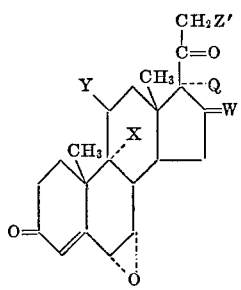

A wherein Q, W and X are as hereinabove defined for Formula I, Y is a member selected from the group consisting of formyloxy, acetoxy and halogenoacetoxy, and Z′ is a member selected from the group consisting of hydrogen, halogen, OR″ wherein R″ is an acyl radical of an acid selected from the group consisting of a hydrocarbon acid having up to 12 carbon atoms, and Z′ when taken together with Q, 17α,21-lower alkylidenedioxy;

with an alkali metal azide in a non-reactive, organic solvent;

treating the resulting 6β-azido-7α-hydroxy-4-pregnene-3,20-dione of following Formula B:

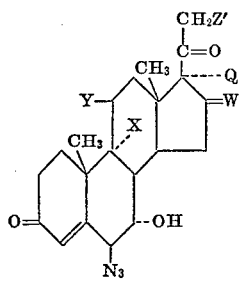

B wherein Q, W, X, Y and Z′ are as hereinabove defined for Formula A, with an acylating agent selected from the group consisting of an acid anhydride of a hydrocarboncarboxylic acid having up to 8 carbon atoms and an acyl halide of an acid selected from the group consisting of a hydrocarboncarboxylic acid having up to 8 carbon atoms and a hydrocarbonsulfonic acid having up to 7 carbon atoms;

and treating the resulting 6β-azido-7α-acyloxy-4-pregnene-3,20-dione of the following Formula C:

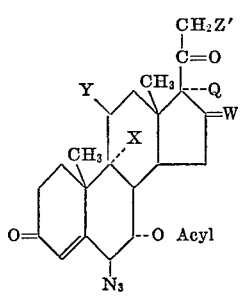

C wherein Q, W, X, Y and Z′ are as hereinabove defined for Formula A, with tetraalkylammonium halide in an aprotic solvent, and treating the resulting 6-azido-4,6-pregnadiene-3,20-dione of following Formula D:

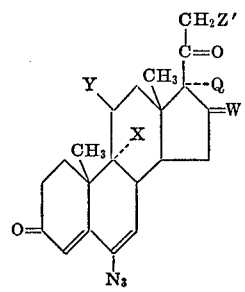

D wherein Q, W, X, Y and Z′ are as hereinabove defined for Formula A;

with a hydrolytic agent selected from the group consisting of a basic hydrolytic medium and *Flavobacterium dehydrogenans* (ATCC 13930).

24. A process according to claim 23 wherein Y is a member selected from the group consisting of formyloxy, acetoxy, and trifluoroacetoxy.

25. A process according to claim 23 wherein Y is acetoxy and said hydrolytic agent is *Flavobacterium dehydrogenans* (ATCC 13930).

26. A process according to claim 23 wherein said hydrolytic agent is *Flavobacterium dehydrogenans* (ATCC 13930) and wherein said 6α,7α-oxido-4-pregnene-3,20-dione of Formula A is a compound wherein Q is hydroxy, W is a member selected from the group consisting of hydrogen and (H,methyl), and Y and Z′ are each acetoxy, said process comprising treating a 6α,7α-oxido-4-pregnene-3,20-dione of the following Formula A:

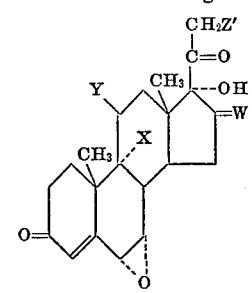

A wherein W, Y and Z′ are as hereinabove defined, and X is a member selected from the group consisting of hydrogen and halogen having an atomic weight less than 100;

with an alkali metal azide in a non-reactive, organic solvent;

and treating the resulting 6β-azido-7α-hydroxy-4-pregnene-3,20-dione of following Formula B:

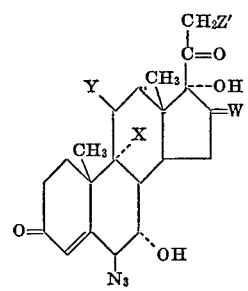

B wherein W, X, Y and Z′ are as hereinabove defined for Formula A;

with an acylating agent selected from the group consisting of an acid anhydride of a hydrocarboncarboxylic acid having up to 8 carbon atoms and an acyl halide selected from the group consisting of a hydrocarboncarboxylic acid having up to 8 carbon atoms and a hydrocarbonsulfonic acid having up to 7 carbon atoms;

and treating the resulting 6β-azido-7α-acyloxy-4-pregnene-3,20-dione of following Formula C:

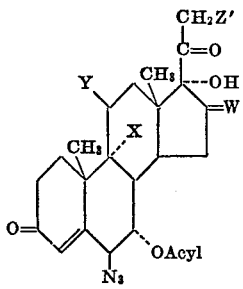

wherein W, X, Y and Z' are as hereinabove defined for Formula A;
with tetraalkylammonium halide in an aprotic solvent; and treating the resulting 6-azido-4,6-pregnadiene-3,20-dione of following Formula D:

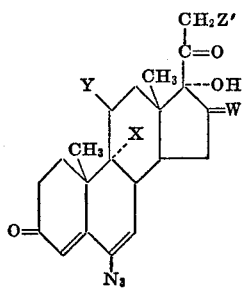

wherein W, X, Y and Z' are as hereinabove defined for Formula A;
with *Flavobacterium dehydrogenans* (ATCC 13930); whereby is formed a compound of Formula I wherein Y and Z are each hydroxy, said compound being 6-azido-9α-X-16 - W - 4,6 - pregnadiene-11β,17α,21-triol-3,20-dione wherein X and W are as hereinabove edfined for Formula A.

27. A process according to claim 26 wherein said acylating agent is acetic anhydride in pyridine and 4-dimethylaminopyridine, said tetraalkylammonium halide in an aprotic solvent is tetramethylammonium fluoride in acetonitrile, and said 6α,7α-oxido-4-pregnene-3,20-dione of Formula A is a compound wherein X is fluorine and W is (H,α-methyl), said process comprising treating 6α, 7α-oxido-9α-fluoro-16α-methyl-4 - pregnene - 11β,17α,21-triol-3,20-dione 11,21-diacetate with an alkali metal azide in a non-reactive, organic solvent;
treating the resulting 6β-azido-7α-hydroxy-9α-fluoro-16α-methyl - 4 - pregnene - 11β,17α,21 - triol - 3,20-dione 11,21-diacetate with acetic anhydride in pyridine and 4-dimethylaminopyridine;
treating the resulting 6β-azido-9α-fluoro-16α-methyl-4-pregnene-7α,11β,17α,21 - tetrol-3,20 - dione 7,11,21-triacetate with tetramethylammonium fluoride in acetonitrile;
and treating the resulting 6-azido-9α-fluoro-16α-methyl-4,6-pregnadiene-11β,17α,21-triol - 3,20 - dione 11,21-diacetate with *Flavobacterium dehydrogenans* (ATCC 13930), whereby is obtained 6-azido-9α-fluoro-16α-methyl - 4,6 - pregnadiene - 11β,17α,21-triol-3,20-dione.

28. A process according to claim 26 wherein said acylating agent is acetic anhydride in pyridine and 4-dimethylaminopyridine, said tetraalkylammonium halide in an aprotic solvent is tetramethylammonium fluoride in acetonitrile, and said 6α,7α-oxido-4-pregnene-3,20-dione of Formula A is a compound wherein X is fluorine and W is (H,β-methyl), said process comprising treating 6α, 7α-oxido-9α-fluoro - 16β - methyl - 4 - pregnene - 11β, 17α,21 - triol - 3,20 - dione 11,21-diacetate with an alkali metal azide in a non-reactive, organic solvent;
treating the resulting 6β-azido-7α-hydroxy-9α-fluoro- 16β-methyl-4-pregnene-11β,17α,21-triol - 3,20 - dione 11,21-diacetate with acetic anhydride in pyridine and 4-dimethylaminopyridine;
treating the resulting 6β-azido-9α-fluoro-16β-methyl-4-pregnene-7α,11β,17α,21-tetrol - 3,20 - dione 7,11,21-triacetate with tetramethylammonium fluoride in acetonitrile;
and treating the resulting 6-azido-9α-fluoro-16β-methyl-4,6 - pregnadiene - 11β,17α,21 - triol - 3,20-dione 11,21 - diacetate with *Flavobacterium dehydrogenans* (ATCC 13930), whereby is obtained 6-azido-9α-fluoro-16β-methyl - 4,6 - pregnadiene - 11β,17α,21-triol-3,20-dione.

29. In the process of preparing a 6-azido-11β-hydroxy-4,6-pregnadiene-3,20-dione wherein a 6α,7α - oxido - 11β-hydroxy - 4 - pregnene - 3,20 - dione starting compound is treated with an alkali metal azide in a non-reactive, organic solvent, and either the resulting 6β-azido-7α,11β-dihydroxy-4-pregnene-3,20-dione is treated with concentrated hydrochloric acid in a lower alkanolic acid together with an inert solvent, or a 7α-ester of said 6β-azido-7α, 11β-dihydroxy-4-pregnene-3,20-dione is treated with a dehydroacylating agent selected from the group consisting of tetraalkylammonium halide in an aprotic solvent, and concentrated hydrochloric acid in a lower alkanoic acid together with an inert solvent, said 7α-ester being a member selected from the group consisting of a 7α-lower alkanoate having up to 8 carbon atoms and a 7α-hydrocarbonsulfonate having up to 7 carbon atoms, whereby a 6-azido-11β-hydroxy - 4,6 - pregnadiene - 3,20 - dione is formed;
the improvement which comprises preparing an 11β-acyloxy derivative of said 6α,7α-oxido-11β-hydroxy-4-pregnene-3,20-dione starting compound prior to treatment with an alkali metal azide, said 11β-acyloxy derivative being a member selected from the group consisting of 11β-formyloxy-, 11β-acetoxy-, and 11β-halogenoacetoxy-;
and subsequently hydrolyzing said 11β-acyloxy by treating a 6-azido-11β-acyloxy-4-pregnene selected from the group consisting of a 6β-azido-7α-hydroxy-11β-acyloxy-4-pregnene-3,20-dione and a 6-azido-11β-acyloxy-4,6-pregnadiene-3,20-dione with a hydrolytic agent selected from the group consisting of a basic hydrolytic medium, and *Flavobacterium dehydrogenans* (ATCC 13930).

30. The process according to claim 29 wherein said 11β-acyloxy derivative is an 11β-acetoxy derivative, said dehydroacylating agent is tetramethylammonium fluoride, said hydrolytic agent is *Flavobacterium dehydrogenans* (ATCC 13930), and wherein said subsequent hydrolysis is carried out on a 6-azido-11β-acetoxy-4,6-pregnadiene-3,20-dione;
said improvement process comprising treating an 11-acetate ester of a 6α,7α-oxido-11β-hydroxy-4-pregnene-3,20-dione with an alkali metal azide in a non-reactive, organic solvent, treating a 7α-ester of the resulting 6β-azido-7α-hydroxy-11β-acetoxy - 4 - pregnene-3,20-dione with tetramethylammonium fluoride in an aprotic solvent, said 7α-ester being a member selected from the group consisting of a 7α-lower alkanoate having up to 8 carbon atoms and a 7α-hydrocarbonsulfonate having up to 7 carbon atoms, and subjecting the 6-azido-11β-acetoxy-4,6-pregnadiene-3,20 - dione thereby formed to the action of *Flavobacterium dehydrogenans* (ATCC 13930), whereby is formed a 6-azido-11β-hydroxy-4,6-pregnadiene-3,20-dione.

No references cited.

ELBERT L. ROBERTS, Primary Examiner

U.S. Cl. X.R.

260—397.45, 239.55, 239.55 D; 195—51